(12) United States Patent
Nelson et al.

(10) Patent No.: US 10,371,834 B2
(45) Date of Patent: Aug. 6, 2019

(54) DETECTOR SYSTEMS FOR INTEGRATED RADIATION IMAGING

(71) Applicants: Robert Sigurd Nelson, La Mesa, CA (US); William Bert Nelson, Excelsior, MN (US)

(72) Inventors: Robert Sigurd Nelson, La Mesa, CA (US); William Bert Nelson, Excelsior, MN (US)

(73) Assignee: Minnesota Imaging and Engineering LLC, Excelsior, MN (US)

( * ) Notice: Subject to any disclaimer, the term of this patent is extended or adjusted under 35 U.S.C. 154(b) by 632 days.

(21) Appl. No.: 13/573,981

(22) Filed: Oct. 18, 2012

(65) Prior Publication Data

US 2014/0110592 A1 Apr. 24, 2014
US 2017/0016999 A9 Jan. 19, 2017

Related U.S. Application Data

(60) Provisional application No. 61/689,139, filed on May 31, 2012, provisional application No. 61/690,348, filed on Jun. 25, 2012.

(51) Int. Cl.
  *G01T 1/24* (2006.01)
  *G01T 1/161* (2006.01)
  *B82Y 15/00* (2011.01)

(52) U.S. Cl.
  CPC ............ *G01T 1/247* (2013.01); *G01T 1/1611* (2013.01); *B82Y 15/00* (2013.01)

(58) Field of Classification Search
  CPC ..... G01T 1/2985; G01T 1/2928; G01T 1/249; A61B 6/037; A61B 6/4258
  See application file for complete search history.

(56) References Cited

U.S. PATENT DOCUMENTS 4,260,054 A  4/1981 Bory et al.
4,308,252 A  12/1981 Tomaich et al.
(Continued)

FOREIGN PATENT DOCUMENTS

EP  1072717 A1  1/2001
GB  2334666 A  9/1999
(Continued)

OTHER PUBLICATIONS

Da Via C., et al., "Dual Readout-Strip / Pixel Systems", Nucl. Instr. Meth A594 (2008) p. 7.
(Continued)

*Primary Examiner* — Christine S. Kim
(74) *Attorney, Agent, or Firm* — Dorsey & Whitney LLP

(57) ABSTRACT

The invention provides novel Compton camera detector designs and systems for enhanced radiographic imaging with integrated detector systems which incorporate Compton and nuclear medicine imaging, PET imaging and x-ray CT imaging capabilities. Compton camera detector designs employ one or more layers of detector modules comprised of edge-on or face-on detectors or a combination of edge-on and face-on detectors which may employ gas, scintillator, semiconductor, low temperature (such as Ge and superconductor) and structured detectors. Detectors may implement tracking capabilities and may operate in a non-coincidence or coincidence detection mode.

62 Claims, 6 Drawing Sheets

(56) References Cited

U.S. PATENT DOCUMENTS

| | | |
|---|---|---|
| 4,560,882 A | 12/1985 | Nelson |
| 4,564,005 A | 1/1986 | Marchand et al. |
| 4,937,453 A | 6/1990 | Nelson |
| 4,978,297 A | 12/1990 | Vlock |
| 5,258,145 A | 11/1993 | Nelson |
| 5,434,417 A | 7/1995 | Nygren |
| 6,583,420 B1 | 6/2003 | Nelson et al. |
| 6,693,291 B2 | 2/2004 | Nelson et al. |
| 7,015,460 B2 | 3/2006 | Nelson et al. |
| 7,147,372 B2 | 12/2006 | Nelson et al. |
| 7,291,841 B2 | 11/2007 | Nelson et al. |
| 7,635,848 B2 | 12/2009 | Nelson |
| 7,692,156 B1 | 4/2010 | Nagarkar |
| 7,778,380 B2 | 8/2010 | Altman et al. |
| 7,968,853 B2 | 6/2011 | Altman et al. |
| 8,017,906 B2 | 9/2011 | Nelson et al. |
| 8,115,174 B2 | 2/2012 | Nelson |
| 8,115,175 B2 | 2/2012 | Nelson |
| 8,183,533 B2 | 5/2012 | Nelson |
| 8,183,535 B2 | 5/2012 | Danielsson |
| 8,378,310 B2 | 2/2013 | Bornefalk et al. |
| 9,347,893 B2 | 5/2016 | Nelson et al. |
| 9,384,864 B2 | 7/2016 | Nelson et al. |
| 10,088,580 B2 | 10/2018 | Nelson et al. |
| 2002/0011571 A1 | 1/2002 | Lin |
| 2003/0034455 A1* | 2/2003 | Schreiner ............. G01T 1/1642 250/366 |
| 2003/0072419 A1* | 4/2003 | Bruder ................... A61B 6/032 378/210 |
| 2004/0251419 A1 | 12/2004 | Nelson |
| 2005/0258373 A1* | 11/2005 | Lacy ...................... G01T 1/185 250/390.01 |
| 2006/0151708 A1 | 7/2006 | Bani-Hashemi |
| 2007/0184998 A1 | 8/2007 | Evans et al. |
| 2007/0263764 A1* | 11/2007 | Mccallum ............. G01T 1/2018 378/19 |
| 2008/0230704 A1* | 9/2008 | Daghighian ............. 250/363.03 |
| 2010/0204942 A1 | 8/2010 | Danielsson et al. |
| 2010/0215230 A1 | 8/2010 | Bornefalk et al. |
| 2011/0051895 A1* | 3/2011 | Vogtmeier ............. A61B 6/032 378/92 |
| 2012/0181437 A1 | 7/2012 | Nelson et al. |
| 2013/0026380 A1* | 1/2013 | Tkaczyk et al. ......... 250/370.13 |
| 2013/0028379 A1 | 1/2013 | Nelson et al. |
| 2013/0187053 A1* | 7/2013 | Colby .................... B82Y 20/00 250/366 |
| 2014/0110592 A1 | 4/2014 | Nelson et al. |
| 2015/0331115 A1 | 11/2015 | Nelson et al. |
| 2016/0021674 A1 | 1/2016 | Lee |
| 2017/0016999 A9 | 1/2017 | Nelson et al. |

FOREIGN PATENT DOCUMENTS

| | | |
|---|---|---|
| WO | 2012127257 A1 | 9/2012 |
| WO | 2017015473 A8 | 9/2017 |

OTHER PUBLICATIONS

Knoll G, "Radiation Detection and Measurement", 4th edition, Wiley, 2010.

Kroeger R, et al., "Three-Compton Telescope: Theory, Simulations, and Performance", IEEE Trans. Nucl. Sci., vol. 49(4), pp. 1887-1892, Aug. 2002.

Parker S., et al., "3DX: an X-ray pixel array detector with active edges", IEEE Trans. Nucl. Sci., 53 (2006) 1676-1688.

Parker S., et al., "Increased speed: 3D silicon sensors; Fast current amplifiers", IEEE Trans. Nucl. Sci., 58 (2011) 404-417.

Singh, M., "An electronically collimated gamma camera for single photon emission computed tomography. Part 1: Theoretical considerations and design criteria", Medical Physics vol. 10(4), pp. 421-427, Jul./Aug. 1983.

Singh, M., Doria D., "An electronically collimated gamma camera for single photon emission computed tomography. Part II: Image reconstruction and preliminary experimental measurements", Medical Physics vol. 10(4), pp. 428-435, Jul./Aug. 1983.

Urdaneta, M. et al., "Quantum dot composite radiation detectors", IEEE Nuclear Science Symposium, oral presentation, 2010.

Yu, H. and G. Wang, "Compressed sensing based interior tomography", Phys Med Biol, vol. 54(9): p. 2791-2805, 2009.

R. Nowotny, Application of Si-Microstrip-Detectors in Medicine and Structural Analysis, Elsevier Science Publications, Nuclear Instruments and Methods in Physics Research 226 (1984) 34-39, North-Holland, Amsterdam.

Third-party submission under 37 CFR 1.290 filed on Mar. 4, 2016 and entered in U.S. Appl. No. 14/804,799.

Third-party submission under 37 CFR 1.290 filed on Mar. 4, 2016 and entered in U.S. Appl. No. 14/804,838.

Anderson, E.W. et al, "A Scintillator Hodoscope at the Tevatron Collider", Fermi National Accelerator Laboratory, FERMILAB-Pub-90/152-E [E-735] Jul. 1990.

International Search Report and Written Opinion, PCT application PCT/IB2011/000576, dated Dec. 13, 2011, 9 pages.

Cherry, Simon et al., "Physics in Nuclear Medicine", 3rd Edition, Saunders, New York, 2003.

Kronberger, Matthias et al., "Probing the Concepts of Photonic Crystals on Scintillating Materials", IEEE Transactions on Nuclear Science, Jun. 2008, vol. 55, No. 3.

Nagarkar, Vivek et al., "Continuous Phoswich Detector for Molecular Imaging", , IEEE NSS/MIC, Knoxville, TN, Oct. 30-Nov. 6, 2010.

"International Preliminary Report on Patentability", Application No. PCT/IB2011/000576, dated Sep. 24, 2013, 6 pages.

"International Preliminary Report on Patentability", Application No. PCT/US2016/043361, dated Jan. 23, 2018, 8 pages.

"International Search Report and Written Opinion", Application No. PCT/US2016/043361, dated Dec. 16, 2016, 12 pages.

\* cited by examiner

DETECTOR SYSTEMS FOR INTEGRATED RADIATION IMAGING

CROSS-REFERENCE TO RELATED APPLICATIONS

This application claims priority to U.S. Provisional Application Ser. No. 61/689,139, filed on May 31, 2012, and U.S. Provisional Application Ser. No. 61/690,348, filed on Jun. 25, 2012.

FIELD

This invention provides novel implementations of Compton camera detector systems that can be employed as novel integrated Compton-PET detector systems and CT-Compton-PET detector systems for diagnostic medical and small animal imaging (x-ray CT, nuclear medicine, PET) as well as radiation therapy, dental, industrial, Homeland Security and scientific radiation imaging.

BACKGROUND

The combining of imaging modalities to offer increased functionality has produced a number of useful imaging systems, particularly in medical diagnostic and small animal imaging. For example, Gamma ray PET detector systems are frequently sold with x-ray CT detector systems (although the PET and CT detector systems are physically separate and therefore do not share detectors or a common imaging space). A notable previous attempt at offering an integrated imaging system (in which detectors and the imaging space of the system are shared) was a SPECT-PET (nuclear medicine and PET) imaging system which reduced costs by sharing detectors and the imaging space (the volume in which the object is imaged). Although these SPECT-PET imaging systems were not well received commercially due to performance compromises nonetheless they offered interesting functionality since SPECT and PET images could be acquired separately or simultaneously in a shared imaging space (thereby avoiding registration error between separately acquired SPECT and PET images and reducing the total scan time). In addition, simultaneous CT-SPECT systems have been proposed (typically using CZT or CdTe) although issues arise due to generally differing collimation and flux rate requirements.

SUMMARY

The invention utilizes the recent improvements in high speed detector electronics along with detector materials developed for medical diagnostic slit scanning and CT, nuclear medicine, PET imaging, high energy physics, inspection, etc. to develop cost-effective, single purpose and multipurpose integrated detector systems which implement one or more properties of Compton camera detector systems. Compton cameras are frequently implemented as multilayer detectors. Conventional photon-tracking Compton camera designs include a single layer (a front-end detector) which provides 3D detector properties by incorporating a stack of face-on detector planes of the same material such as low-Z Silicon (Si) or moderate-Z Germanium (Ge), essentially a multilayer detector, and a multilayer (dual layer) configuration which combines a 2D detector first layer (the front-end detector) and a 2D detector second layer (the back-end detector). The conventional dual-layer, front-end/back-end detector configuration typically consists of a face-on, planar, 2D Si (low-Z) front-end detector combined with a face-on, 2D high-Z back-end detector. Thus, these two Compton camera configurations utilize detector layers of the same material (low-Z and moderate-Z for Compton scattering) or different materials (low-Z for Compton scattering and high-Z for photoelectric interactions) for the detection of photons in the diagnostic energy range of medical imaging. Clearly other choices of materials can be made depending on the photon energy range or if other types of particles (neutrons, muons, etc.) are to be detected. Unconventional Compton camera designs (as well as x-ray scanning and CT, SPECT, PET and hand-held probe designs have been described in various U.S. patents and applications including: Nelson, U.S. Pat. No. 4,560,882; Nelson, U.S. Pat. No. 4,937,453; Nelson, U.S. Pat. No. 5,258,145; Nelson, U.S. Pat. No. 6,583,420; Nelson, U.S. Pat. No. 7,291,841; Nelson, U.S. Pat. No. 7,635,848; Nelson, U.S. Pat. No. 8,017,906; Nelson, U.S. Pat. No. 8,115,174; Nelson, U.S. Pat. No. 8,115,175; Nelson, U.S. Pat. No. 8,183,533; Nelson, U.S. patent application Ser. No. 13/199,612; Nelson, U.S. patent application Ser. No. 13/507,659 and are incorporated herein. Compton camera detector systems exploit the Compton scatter interaction and can also exploit photoelectric interactions (and even pair production interactions at sufficiently high photon energies). Compton camera detector systems include the capability to track these interactions in terms of spatial location and energy deposition with a temporal resolution limited by the detector itself and the readout electronics. Typically the interaction information is used to estimate the directionality and energy of the photon incident on the Compton camera detector system whether the photon is an x-ray, a gamma ray, or an annihilation gamma ray. Note that with the addition of collimation such as (for example) a pin hole or parallel hole collimator, the Compton camera can be converted into a nuclear medicine SPECT camera (Gamma camera). This is an example of a dual-use, integrated Compton detector system in which the types of applications are relatively unchanged but the capabilities of the of the detector system are modified (Nelson, U.S. Pat. No. 7,291,841; Nelson, U.S. Pat. No. 8,017,906). The collimation now provides the directionality of an incident gamma ray independent of directionality determined by applying Compton camera reconstruction algorithms. It will be shown that the integrated Compton detector system design can be applied to a range of applications (including nuclear medicine). By employing two or more Compton camera detector systems with electronic coincidence circuitry (used in medical PET detector systems) coincidence PET imaging can be implemented. The flexibility of the Compton camera detector system design allows versatile non-coincidence Compton-PET and coincidence Compton-PET detector systems to be implemented. Furthermore, CT capability can be implemented in the Compton camera detector system design, including non-coincidence and coincidence Compton-PET designs resulting in CT-Compton-PET detector systems. A simplification of this design in which the CT detector and the Compton-PET detector (or just a PET detector) function independently will be referred to as a limited CT-Compton-PET detector system. Although applications discussed herein are primarily directed at medical diagnostic x-ray and gamma ray radiation detection, in principle the invention can also be used to detect radiation such as charged particles (alphas, betas, protons, muons, etc.) and neutrons (as well as other neutral particles) for the applications previously described. Furthermore, the Compton camera detector systems described herein can be combined with or integrated with other imaging modalities such as MRI scanners, optical scanners, ultrasound scanners, opto-acoustic scanners, microwave scanners, etc. It should be understood that the variations of the dual-use detector systems (triple-use detector systems can also implemented) described herein can be employed for simultaneous or non-simultaneous imaging as required by the appropriate application.

The invention provides Compton camera detector designs that employ one or more layers of detector modules comprised of edge-on or face-on (or tilted) detectors or a combination of edge-on and face-on detectors (as well as tilted detectors). Edge-on detectors (and tilted detectors) can incorporate sub-aperture resolution (SAR) capabilities and face-on detectors can incorporate depth-of-interaction (DOI) capabilities. One or more types of detectors can be employed, including: scintillator detectors, semiconductor detectors, gas detectors, low temperature (such as Ge or superconductor) detectors and structured detectors. Detectors can offer block, 1D, 2D or 3D spatial resolution as well as adequate, fast or very fast temporal resolution (depending on the application requirements). Detectors can offer fixed or adjustable pixels sizes which can be uniform or non-uniform. The effective pixel length along a detector column can be synthesized from the outputs of one or more uniformly spaced pixels. Parallel or focused pixel structures can be implemented. Detectors can operate as energy integrators, photon counters (PCs) and photon counters with energy resolution (PCEs). Possible detector formats include planar (and focused planar) and focused structure (ring, partial ring as well as focused ring and focused partial ring) detector geometries.

The details of one or more embodiments of the invention are set forth in the accompanying drawings and the description below. Other features, objects, and advantages of the invention will be apparent from the description and drawings, and from the claims.

All publications, patents and patent applications cited herein are hereby expressly incorporated by reference for all purposes.

DETAILED DESCRIPTION

Figure 1:
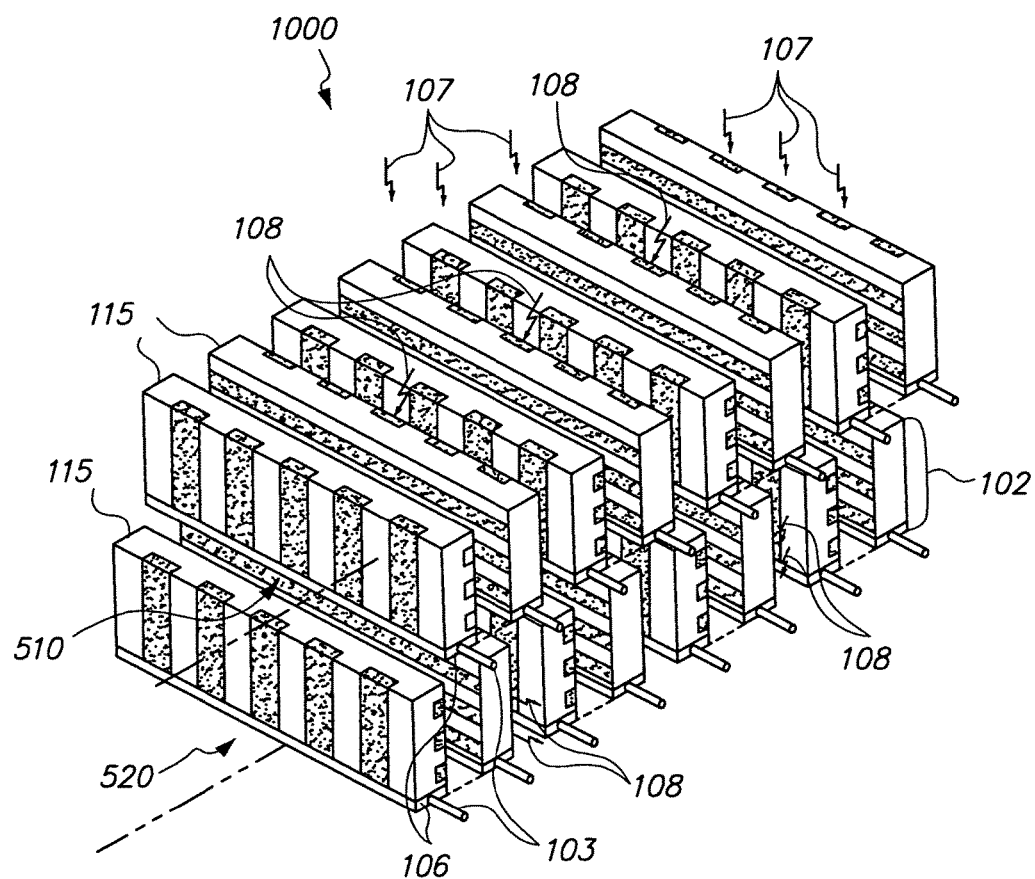
FIG. 1 illustrates a perspective view of a non-coincidence Compton-PET detector imaging system.

The invention provides novel Compton camera detector designs and systems for enhanced radiation imaging including Compton and nuclear medicine imaging, PET imaging and x-ray CT imaging. The invention also provides integrated detector systems based on Compton camera designs. In one aspect, the invention provides integrated non-coincidence Compton-PET detector imaging systems. In another aspect, the invention provides integrated coincidence Compton-PET detector imaging systems. In yet another aspect, the invention provides limited integrated CT-Compton-PET detector imaging systems. In still another aspect, the invention provides integrated non-coincidence CT-Compton-PET detector imaging systems. In another aspect, the invention provides integrated coincidence CT-Compton-PET detector imaging systems. Since the integrated nature of these Compton camera detector design implementations is readily apparent the term "integrated" will frequently be omitted when referring to them. Therefore 'integrated non-coincidence Compton-PET detector imaging systems' will also be referred to as 'non-coincidence Compton-PET detector imaging systems', etc.

The invention employs a range of detector types and formats. The use of gas, scintillator, semiconductor, low temperature (such as Ge and superconductor) and structured detectors in edge-on and/or face-on geometries has previously been described for both medical and non-medical imaging applications. Medical imaging applications include diagnostic x-ray imaging (such as slit scanning, slot scanning, flat panel or planar cone beam CT, focused structure ring or partial ring fan beam CT), nuclear medicine imaging (Compton camera, SPECT/gamma camera detector imaging systems as well as hand held probe detectors), PET imaging, dental imaging and radiation therapy portal and cone beam CT imaging. Non-medical imaging applications include high energy Physics, x-ray and gamma ray Astronomy, industrial radiography, Home Land Security (HLS) and military applications. Furthermore it has been shown that detector spatial resolution can be enhanced using sub-aperture resolution (SAR) or depth-of-interaction (DOI) readout techniques with edge-on and face-on detector geometries, respectively. Detectors may be layered (stacked) and detector modules within a layer can be partially- or completely-offset from neighboring detector modules. Detectors may function as energy integrators, photon counters (PCs) or photon counters with energy resolution (PCEs) depending on the application. High speed electronics is provided for tracking interactions and analyzing the readout signals. An electronic communications link is provided to a computer for data post-processing, storage, and display. One or more tracking capabilities such as examining nearest neighbor pixels for effects related to induced signals and charge diffusion, following scattered or characteristic x-ray radiation within a detector layer and between detector layers (if there is more than one detector layer), following Compton scattered electrons and photoelectrons and measuring coincidence events (for example, the detection of pairs of annihilations photons in PET imaging), etc. can be implemented. Tracking techniques are used in photon counting and spectral x-ray imaging, SPECT, PET, Compton cameras, hand-held radiation detector probes, neutron detectors, detectors with SAR or DOI capability and high energy Physics particle detectors. Various Compton camera implementations have been described previously that incorporate one or multiple detector layers. These detector layers provide suitable 2D or 3D spatial resolution, energy resolution, temporal resolution and tracking capability. Compton camera, nuclear medicine SPECT/gamma camera and PET detector imaging systems, tracking, x-ray CT and slit and slot scan detectors, hand held probe detectors, edge-on and face-on detectors (with or without SAR or DOI capability), integrating, PC, and PCE detectors, multi-material detectors along with planar and focused structure detector geometries have been described in various U.S. patents and applications including: Nelson, U.S. Pat. No. 4,560,882; Nelson, U.S.

Pat. No. 4,937,453; Nelson, U.S. Pat. No. 5,258,145; Nelson, U.S. Pat. No. 6,583,420; Nelson, U.S. Pat. No. 7,291,841; Nelson, U.S. Pat. No. 7,635,848; Nelson, U.S. Pat. No. 8,017,906; Nelson, U.S. Pat. No. 8,115,174; Nelson, U.S. Pat. No. 8,115,175; Nelson, U.S. Pat. No. 8,183,533; Nelson, U.S. patent application Ser. No. 13/199,612; Nelson, U.S. patent application Ser. No. 13/507,659 and are incorporated herein).

Consider a scenario in which radiation is incident upon a planar edge-on detector. The detector thickness (height) now defines the maximum detector entrance aperture while the length or width of the detector area now defines the maximum attenuation distance for edge-on radiation detector designs including semiconductor drift chamber, single-sided strip, and double-sided strip detectors, including micro-strip detector versions. Strip widths can be tapered or curved, in the case of drift chamber detectors, if focusing is desired. In the case of double-sided parallel strip detectors (in which opposing strips are parallel) or crossed strip or 2-D pixelated array detectors, both electrons and holes produced by a radiation event can be collected to provide 1-D positional information between the anode and the cathode sides of the aperture. This 1-D positional information is used to determine electronically the sub-aperture spatial resolution. The interaction position along the height of the edge-on detector aperture will be referred to as the interaction height. (When a scintillator, semiconductor, gas, or liquid detector is irradiated face-on the 1-D positional information along the thickness direction of the detector is referred to as the interaction depth.)

A significant benefit may be gained by implementing sub-aperture resolution (resulting from electronically-defined detector elements) because the edge-on detector aperture height no longer limits the spatial resolution along that direction. Edge-on detectors with larger aperture heights can be employed which will in turn reduce the total number of discrete edge-on detectors (and their readout electronics) required to cover a desired imaging area. Furthermore this 1-D positional information may, in some situations, be used to estimate meaningful corrections to the expected signal losses as a function interaction height and thus improve energy resolution. Other benefits include an increase in available image detector volume due to a decrease in the number of edge-on detector physical boundaries (detector material properties typically degrade near the perimeter) and the number of gaps that may be present between edge-on detector planes.

Semiconductor detectors may not be the most cost-effective solution for all imaging applications in nuclear medicine (or applications such as remediation of radioactive contaminates, etc.). Scintillation phosphors may still offer opportunities when fast readout times are required or high atomic numbers and densities are desired. Depth-of-interaction information and interaction height information (sub-aperture resolution) can be acquired using 1-D and 2-D edge-on scintillator arrays by adding a dual-readout (photodetector readout in this case) capability as was done with 1-D and 2-D edge-on semiconductor arrays.

The benefits of sub-aperture resolution (increased spatial resolution, signal loss compensation, fewer readout detectors, increased detector volume) that are possible with edge-on semiconductor detectors can also be attained using scintillator arrays in an edge-on detector geometry. By calibrating the relative signal strength versus interaction location in the direction of the aperture height (interaction height) sub-aperture resolution can be achieved with a dual-readout, edge-on scintillator array detector. (With sufficiently fast readout detectors time-of-flight measurements could be used to determine the interaction location.) A 2-D, edge-on scintillator array detector can now function as a 3-D, edge-on scintillator array detector. Using the dual-readout arrangement concept it is straightforward to provide a 1-D, edge-on scintillator array detector with 2-D, edge-on scintillator array detector capabilities. Thus, sub-aperture resolution can be attained for 1-D and 2-D edge-on scintillator detectors and can be used for SPECT, PET, and Compton gamma cameras (as well as neutron and particle detectors).

If side-irradiation is implemented then the outcome of stacking two or more edge-on detector arrays made from different materials can be achieved in a straightforward manner. Two distinct edge-on detector arrays (comprised of edge-on detector planes made from material 1 and material 2, respectively) can be placed in series (so that the right edge of each material 1 edge-on detector plane is adjacent to the corresponding left edge of a material 2 edge-on detector plane) and then the combined array can be irradiated from the either the left or right side. If irradiated from the left side then material 1 edge-on detector planes would interact with the radiation first. If irradiated from the right side then material 2 edge-on detector planes would interact with the radiation first. In general spatial and energy resolution may be enhanced if sub-aperture height information is acquired for edge-on detectors that are irradiated from the side. The side-irradiation geometry can also be employed for other radiation imaging applications that have been described previously.

This material is found verbatim in Nelson et al., U.S. Pat. No. 7,291,841, at col. 5, lines 43-65; col. 6, lines 18-34; col. 6, line 65—col. 7, line 8; col. 20, lines 52-56; col. 21, lines 4-14 and 47-50; and col. 25, lines 41-59, respectively. The Nelson'841 patent was previously incorporated by reference on the original filing date (see specification at paragraphs [0003], [0015]), and there is no new matter under 37 C.F.R. § 1.57(g) and § 1.121(f).

X-ray or gamma ray interactions (in medical imaging applications) can be tracked between sufficiently thin detector layers, each with 2D spatial resolution capability. If the depth of a 2D detector layer is sufficiently small such that tracking position errors are acceptable then it effectively functions as a restricted 3D detector (its depth resolution is at most the thickness of the detector layer). If detectors offer 3D spatial resolution capability then interaction tracking (including multiple interactions) can be implemented internally within a 3D detector layer as well as between detector layers. Energy resolution can be used to measure the position-dependent energy losses due to the interactions within detectors which in turn can provide an estimate of the energy of the initial incident x-ray or gamma ray. This information can be used to determine whether the initial incident photon energy is within an allowed energy range as well as its directionality. Temporal resolution capability can be used to distinguish between independent incident x-rays or gamma rays interactions (as well as their subsequent interactions) within the Compton camera. It will be shown that very good temporal resolution can be beneficial if coincidence timing is of interest between Compton camera systems (for example, when coincidence PET imaging is implemented). One well-known implementation of a Compton camera reduced cost by using a dual-layer detector design wherein the first layer (front-end) was a small area, face-on, Si or Ge semiconductor pixelated detector which offered 2D spatial resolution. The second layer (back-end) was a large area, face-on, scintillator (gamma camera) detector which also offered 2D spatial resolution (Singh, M., Medical Physics Vol. 10(4), pp. 421-427, July/August 1983 and Singh, M., Doria D., Medical Physics Vol. 10(4), pp. 428-435, July/August 1983). Both front-end and back-end detectors offered appropriate levels of energy resolution for the photon energies employed and temporal resolution for the expected event interaction rates. Since Compton scattered photons include a range of scatter angles the sensitivity of this design is in-part dependent on the separation distance and area of the second layer from the first layer of detectors. A second layer which employs a smaller 3D detector may, in some instances, be more-cost effective than a larger 2D detector which suffers from parallax errors and needs to be positioned further away from the first layer. Another implementation of the Compton camera, the conventional (face-on) Compton telescope camera, consisted of only a first layer detector. This front-end detector was comprised of a stack (and thus could also be viewed as a multilayer detector) of 2D, face-on Si detectors which function together as a 3D detector (Kroeger R, et al., IEEE Trans. Nucl. Sci., Vol. 49(4), pp. 1887-1892, August 2002; Nelson, U.S. Pat. No. 8,017,906). A stack of 2D, face-on Ge detectors (or a thick 3D Ge detector with DOI capability) can also be implemented although the Ge semiconductor must operate at a low temperature. The Compton telescope camera tracks multiple Compton scatters by a photon in order to determine its original direction and energy. Low Z (atomic number) semiconductor materials such as Si and diamond (and sometimes moderate-Z Ge) are often preferred for the front-end Compton scatter detector for photons of relatively low energies (e.g. medical diagnostic x-ray energies, 140.5 keV gamma rays from Tc-99m used in nuclear medicine) compared to the 511 keV gamma rays used in PET imaging. The Compton scatter interaction cross section of the material dominates its photoelectric cross section and the relative contribution to the angular reconstruction error due to the Doppler shift is reduced as Z decreases and/or photon energy increases. As the photon energy increases semiconductor materials with moderate-Z values (such as Ge, GaAs, CdTe, CZT, etc.) represent increasingly acceptable substitutes for low Z semiconductor materials such as Silicon. The amount of energy deposited by relatively low energy photons (commonly used in diagnostic x-ray imaging or nuclear medicine) due to a Compton scatter interaction is typically small and therefore semiconductors detectors are employed as front-end detectors because of their superior energy resolution compared to most scintillator detectors. In the dual-layer Compton camera design lower-cost 2D scintillator detectors may be employed in place of semiconductor detectors as back-end detectors if they offer suitable spatial, temporal and energy resolution. The semiconductor front-end detector may be replaced by a scintillator (or gas) front-end detector although energy resolution may suffer. Any significant reduction in accuracy of the calculated incident photon directionality by Compton reconstruction algorithms can be augmented or supplanted by additional information such as coincidence between detectors (used in coincidence PET imaging). Compton electron tracking in a gas detector can be implemented although this is typically very time-consuming. Cherenkov radiation, despite the relatively weak optical signals, can be exploited for time-of-flight (TOF) measurements. (Cherenkov radiation can be detected when generated in optically-transparent mediums including fluids such as liquids and gases, scintillators and non-scintillators such as transparent plastics, glasses, fibers, diamond films, etc. Thus, transparent dielectric mediums other than scintillators and gases can be also be employed as Compton scatter or photoelectron detectors within a Compton camera detector system although energy resolution would suffer based on the detection of Cherenkov radiation alone. Inexpensive dielectric materials may be acceptable for those applications in which radiation scatter within the object is of reduced importance and therefor lower detector energy resolution is acceptable. Variations of detector designs described previously and herein can include measuring only a Cherenkov signal or a Cherenkov signal and a fluorescence signal or an electronic signal.) Potential advantages of this dual-layer design may include a less-expensive front-end detector and/or a front-end detector that offers a feature such as fast (greater than 1 nanosecond) or very fast (less than 1 nanosecond) temporal resolution. Very fast temporal resolution is of interest for TOF PET. Benefits of TOF PET include improved image resolution and lower patient radiation dose. Furthermore, the use of coincidence information can also simplify the requirements of the back-end detector.

Figure 3:
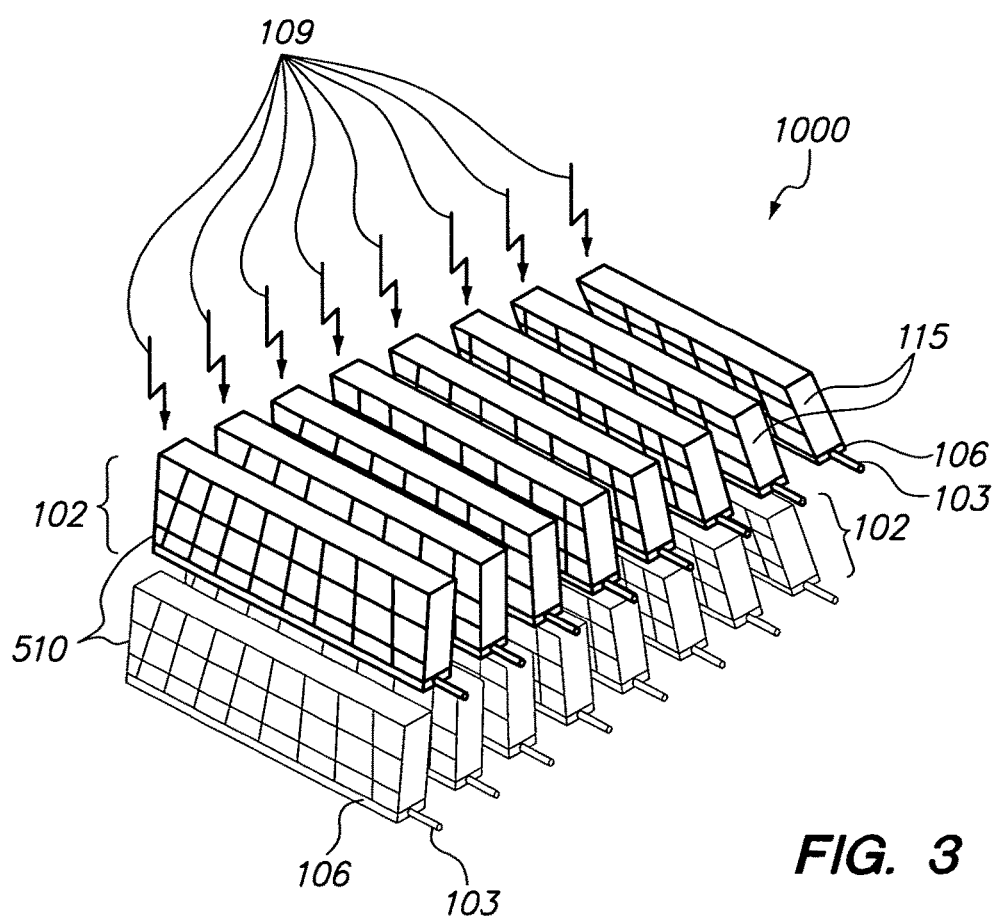
FIG. 3 illustrates a perspective view of a focused planar detector.
Figure 5:
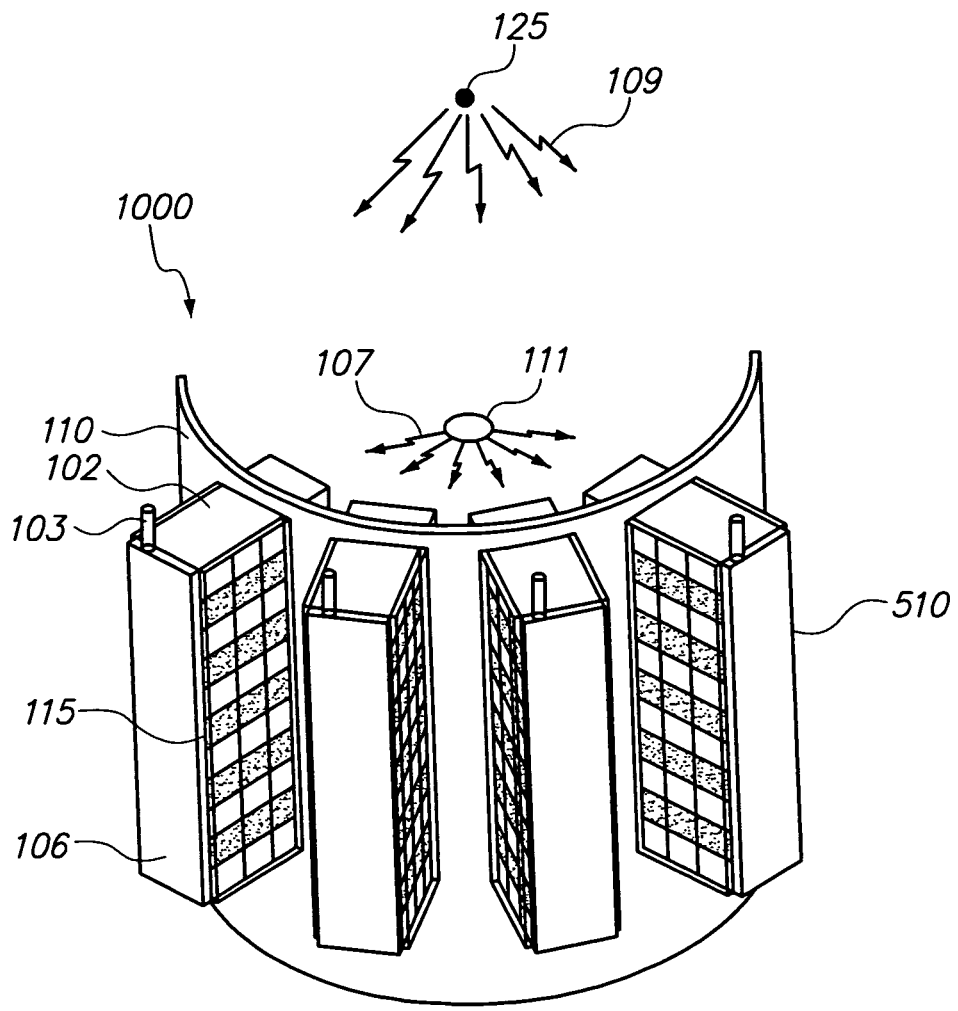
FIG. 5 illustrates a perspective view of a non-coincidence CT-Compton-PET detector imaging system.

Compton electron tracking can also be implemented within a detector layer and between detector layers that employ at least one of scintillator-photodetector, semiconductor, structured and low temperature detectors. Since electrons readily interact with matter electron tracking is preferably implemented when detecting energetic photons which are Compton scattered, typically generating more-energetic electrons with a more-directional nature. (A similar concept applies to energetic photoelectric interactions which typically generate more-energetic photoelectrons with a more-directional nature. Thus, a Compton camera could utilize sufficiently energetic photoelectric interactions for image reconstruction by tracking the highly directional photoelectrons.) The tracking of Compton scattered electrons as well as Compton scattered photons can be simplified by enabling longer path lengths for the scattered particles, improving the estimates of scattering angles. Examples of relatively thin, edge-on detector configurations that incorporate gaps between adjacent detectors (including partially- or completely-offset detectors) are shown in FIGS. 1, 3, 5. Face-on detector configurations with gaps between detector layers can also be implemented. Compton camera image reconstruction can be improved if both the Compton scattered photon and electron are both tracked since the solution can be limited to a fraction of a cone surface rather than the full cone surface.

The flexibility of the Compton camera design can be understood by considering front end (single layer) detector and front-end with back-end (dual-layer) detector implementations of multilayer, edge-on detector Compton camera designs which can be used for low energy and high energy photon imaging. In one dual-layer implementation the front-end detector is used to detect low energy x-rays or gammas and the back-end detector acts as an edge-on SPECT/gamma camera or PET camera (Nelson, U.S. Pat. No. 7,291,841). A focused, edge-on Compton camera design was described that can employ one or multiple (of the same or different materials) detector layers as well as implementing additional features such as the offset (complete or partial) of detector modules within a layer. Completely offset detector modules can be used to create two or more detector layers (offset layers) which when employed together can approximate a continuous detector. The offset layer feature of an edge-on Compton camera design can be implemented in PC, PCE and energy integration versions of diagnostic CT detector (as described in Nelson, U.S. Pat. No. 7,291,841; Nelson, U.S. Pat. No. 7,635,848; Nelson, U.S. Pat. No. 8,017,906; Nelson, U.S. Pat. No. 8,115,174; Nelson, U.S. Pat. No. 8,115, 175; Nelson, U.S. Pat. No. 8,183,533; Danielsson, U.S. Patent Publication No. 2010/0204942; Bornefalk, U.S. Patent Publication No. 2010/0215230).

Implementations of the Compton camera design are described herein that are suitable for use as Compton-PET imaging systems and CT-Compton-PET imaging systems. In addition, the positioning of nuclear medicine collimator hardware such as focused, parallel or pin hole collimators between the object being imaged and the Compton camera permits the system of collimator and Compton camera to provide conventional nuclear medicine imaging capabilities (the imaging capabilities of a SPECT/Gamma camera) for those applications in which the Compton camera does not offer adequate imaging properties. Limited implementations of the Compton camera designs described herein include versions that function only as CT or PET (and SPECT) detector designs. The Compton camera imaging systems described herein will find use in diagnostic medical x-ray CT, nuclear medicine and PET imaging, x-ray micro-CT imaging, dental CT, medium and small animal imaging, radiation therapy imaging, industrial imaging, HLS and military imaging and scientific imaging.

Compton-PET Detector Systems.

One implementation of the Compton camera is referred to as the Compton-PET detector system (Nelson, U.S. Pat. No. 7,291,841). The Compton-PET detector system design allows flexibility in the choice of detector materials as well as detector geometries. This flexibility is constrained by the intended imaging applications (such as PET only, nuclear medicine and PET, x-ray and PET). Face-on, edge-on, and combinations of face-on and edge-on detectors can be employed. One, two or more than two layers of detectors can be employed. Detector modules that comprise a detector layer can optionally be partially-offset or completely-offset from their neighbors within a layer. Common PET image acquisition formats based on planar and focused structure (such as ring and or partial ring) geometries are readily implemented. Compton-PET detector systems are based on block, 1D, 2D or 3D edge-on, face-on, or mixtures of edge-on and face-on detectors (including edge-on detectors with SAR capability and face-on detectors with DOI capability) previously described (Nelson, U.S. Pat. No. 4,560,882; Nelson, U.S. Pat. No. 4,937,453; Nelson, U.S. Pat. No. 5,258,145; Nelson, U.S. Pat. No. 6,583,420; Nelson, U.S. Pat. No. 7,291,841; Nelson, U.S. Pat. No. 7,635,848; Nelson, U.S. Pat. No. 8,017,906; Nelson, U.S. Pat. No. 8,115,174; Nelson, U.S. Pat. No. 8,115,175; Nelson, U.S. Pat. No. 8,183,533). The non-coincidence and coincidence Compton-PET detector systems described herein include focused and unfocused planar detector formats and focused structure (such as ring and partial ring as well as focused ring and focused partial ring) detector formats.

A non-coincidence Compton-PET (one-sided PET) detector system is implemented by extending Compton camera designs that have previously been developed for nuclear medicine imaging devices such as hand held probes or SPECT/Gamma cameras so that the detector system can operate with the lower gamma ray energies used in nuclear medicine as well as the higher energy range of PET with good detection efficiency. A highly flexible implementation of a Compton camera design is a dual-layer, 3D Compton camera. A specific implementation, a non-coincidence Compton-PET detector system, employs a (preferably, but not exclusively) Compton scattering front-end detector and a (preferably, but not exclusively) high-stopping power back-end detector in which both front-end and back-end detectors offer suitable 3D spatial resolution, energy resolution and temporal resolution (Nelson, U.S. Pat. No. 8,017,906). Both the front-end and back-end 3D detectors provide adequate temporal resolution for an expected event rate such that accurate event tracking can be enabled both within the front- and back-end detectors and between the front-end and back-end detectors. Both the front-end and back-end 3D detectors can record Compton scatter and photoelectric interactions. In some instances Raleigh scattering interactions (angle change with insignificant energy loss) can be identified based on tracking information. The front-end and back-end detectors, either separately or together, can operate as two layer Compton cameras and Compton telescope cameras (Nelson, et al., U.S. Pat. No. 8,017,906). In one scenario the 3D front-end detector can function as a single (or multiple) Compton scatter device and the 3D back-end detector can be used to measure the energy and interaction location of the Compton scattered photon. The front-end and back-end detectors have 3D spatial resolution. Front-end and back-end 3D detectors can also Compton-scatter a photon (measuring position and energy deposited) and detect the (single or multiple) Compton-scattered photon (measuring its energy and interaction location). Therefore this two layer Compton camera with 3D detector layers incorporates the capabilities of three conventional two layer Compton cameras (in which one layer Compton-scatters the photon and the other layer detects (stops) the Compton-scattered photon). Compton telescope camera designs exploit multiple Compton scattering for reconstruction. The Compton telescope camera capability can be implemented in the 3D front-end detector, in the 3D back-end detector and between the 3D front-end and back-end detectors (providing the capabilities of three conventional (multilayer, face-on 2D array detectors) Compton telescope cameras. Appropriate two layer Compton camera and Compton telescope camera reconstruction algorithms are used to form an image. When this Compton camera is used to image single annihilation gamma rays created during a PET scan it is referred to as a one-sided PET detector system or a non-coincidence Compton-Pet detector system. (This dual-layer, 3D Compton camera design is clearly not limited to PET imaging alone and therefore may be adapted for use in imaging applications at other photon energies. Furthermore more than two layers of 3D detectors can be employed and non-3D layers of detectors can be mixed with 3D layers of detectors, thereby introducing additional flexibility in the types of imaging applications for which this Compton cameras design is suitable.)

Figure 2:
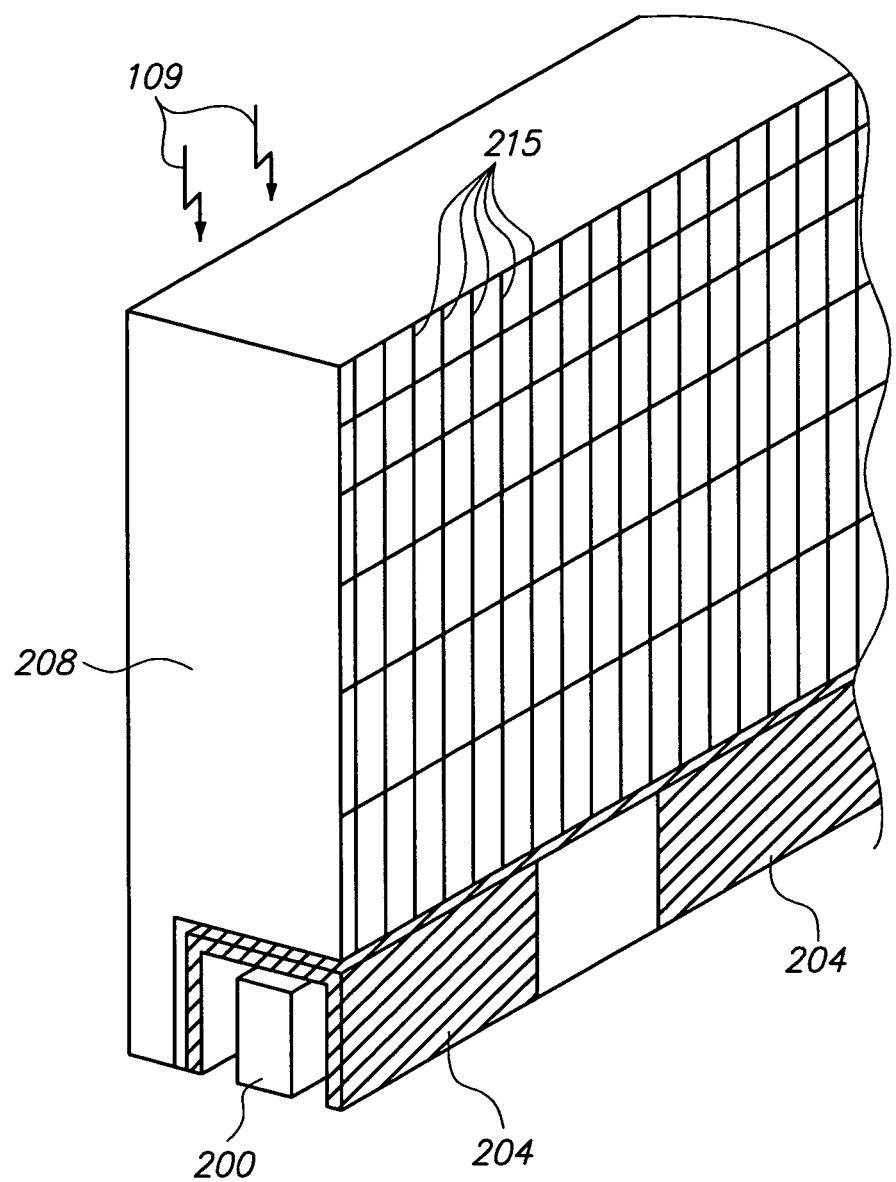
FIG. 2 illustrates a perspective view of an edge-on silicon detector substrate in which shielded readout ASICs are mounted within an etched region along the bottom edge of the semiconductor detector substrate.

This one-sided PET detector can be implemented in a focused or unfocused planar detector geometry or a focused structure detector geometry such as a ring or partial ring (as well as focused ring and focused partial ring detector geometry). This avoids the expense of employing a coincidence PET detector system based on opposing (or nearly-opposing) sets of PET detectors. FIG. 1 shows a dual-layer Compton-PET detector imaging system 1000 that incorporates 3D, edge-on detector arrays 510 and 520 (a first layer of detectors and a second layer of detectors, respectively). The individual, 2D edge-on detector modules 102 use crossed strip radiation detectors 115. Alternatives include 2D pixelated arrays (or 3D pixelated arrays if SAR capability is enabled) in an edge-on geometry. Incident radiation photons 107 from gamma ray radiation source (not shown), with an energy less than the pair production threshold, can undergo Rayleigh scattering, Compton scattering or photoelectric interactions. Compton scattered gamma ray photons 108 can be detected by the edge-on radiation detector within the module 102 responsible for the initial scattering, by other edge-on detectors modules within the front-end detector layer 510 (detector layer 1) or by detector modules within the back-end detector layer 520 (detector layer 2). Each module 102 also includes a base 106 and a communications link 103. The base 106 preferably contains detector electronics including signal conditioners and readout ASICs, power management components, temperature control components, and a data or information channel for communicating with the computer system. The communications link 103 can be used to provide power to the module 102 and connects the base 106 to a computer system. The communication link 103 preferably is used to off-load the digitized detector radiation data to a computer system for analysis and image reconstruction. The computer system, which can include general purpose, dedicated, and embedded computers, provides monitor and control services to modules 102, to the detector layers 510 and 520 and to the entire Compton-PET detector imaging system 1000. The computer system evaluates module parameters, detector layer parameters, and the detected radiation image data. The detected data is processed and can be displayed and stored if desired. Additional relevant module information, such as temperature, amplifier settings, detector voltages, position, orientation, and motion information, can be transmitted to this computer system over the communication link 103. The computer system transmits instructions that update the detector modules 102 and detector layers 510 and 520. This establishes a dynamic information feedback loop that is useful for adaptive imaging (Nelson, et al., U.S. Pat. No. 7,291,841). Note that the electronic functionality of the detector base 106 can be implemented along the side of a detector module or attached to the surface of the detector module (integrated electronics). Another option when the detector substrate is a semiconductor such as Si is to etch an indentation along the bottom of (opposite the radiation entrance surface) and mount the readout ASICs and radiation shielding in the indentation and directly to the substrate along the bottom edge. If the length of the edge-on detector is greater than its height then this configuration allows the readout ASICs to be closer to a set of detector pixels than for the case wherein the readout ASICs are mounted along the side in order to avoid the direct x-ray beam. Preferably the combined thickness of the etched substrate and mounted readout ASIC with shielding would be less than or equal to the thickness of the substrate (avoiding problems if the readout ASIC and any shielding stick out from the substrate and possibly interfering with the x-ray beam seen by offset detectors). FIG. 2 shows a perspective view of readout ASICs 200 with radiation shielding 204 mounted in an etched Si substrate 208 (or another suitable semiconductor substrate) with a pixel size 215 that varies with height which is positioned edge-on to incident radiation photons 109. Other means or delivering power to the detector modules as well as wireless communication can be employed in place of communication link 103 (FIG. 1). It should be understood that readout ASICs can be mounted along the side and the bottom edge. Two or more non-coincidence Compton-PET detector systems (an enhanced non-coincidence Compton-PET detector system) can be employed for a PET imaging application. Furthermore, with the addition of coincidence circuitry, pairs of non-coincidence Compton-PET detector systems (preferably facing each other and positioned on opposite sides of an object) can function as a coincidence Compton-PET detector system. The cost of a two layer non-coincidence Compton-PET (one-sided PET) detector system can be reduced if either one or both of the 3D front-end and back-end detectors can be replaced by a suitable 2D detector with acceptable energy and temporal resolution. The caveat is that photon detection efficiency and reconstruction image quality may suffer as a result. A compromise in terms of cost is to leave the front-end detector with 3D spatial resolution (and therefore retaining the previously listed capabilities: to function as a Compton scatterer, a two layer Compton camera, a Compton telescope camera) and employ a back-end detector with 2D spatial resolution. The back-end detector would offer acceptable stopping power, energy resolution and temporal resolution for the expected gamma ray event rate and gamma ray energies.

For a planar detector geometry the front-end and back-end detectors can consist of single-layer face-on detector plane modules, a multilayer (stack) of face-on detector plane modules, a single-layer of edge-on detector modules, a stack of edge-on detector modules or a combination of face-on and edge-on detector modules. Face-on detector modules can include DOI capability whereas edge-on detector modules can include SAR capability. One implementation of a focused planar detector geometry employs a front-end detector that consists of either a single layer (offset or non-offset) or multiple layers (offset or non-offset) of tilted edge-on detector modules. As an alternative to a parallel pixel structure a focused pixel structure can be implemented along the lengths of the edge-on tilted (or parallel) detector modules to account for x-ray beam divergence. FIG. 3 shows a perspective view of a focused planar detector system 1000 in which detector modules 102 are tilted so as to focus on diverging radiation 109 from a radiation source. In addition the pixel structure 115 within the individual detector modules 102 is angled so as to focus on the same radiation source. The tilting of the detector modules may create unacceptable gaps between neighboring detector modules within the detector layer 510. These gaps are shown to be effectively filled by the complete offset of every other detector modules comprising the offset detector layer 510. One implementation of a focused structure detector geometry such as a ring (or partial ring) employs a front-end detector comprised of a single layer (non-offset) or single layer with an offset layer (which is to be treated in this application as a single layer) of tilted edge-on detector modules. As in the case of planar detectors, a focused pixel structure can be implemented along the lengths of the edge-on tilted detector modules (creating focused ring and focused partial ring detector geometries). Suitable detector configurations and materials have been previously described for Compton, PET, nuclear medicine and x-ray imaging (Nelson, et al., U.S. Pat. No. 6,583,420; Nelson, U.S. Pat. No. 7,291,841; Nelson, U.S. Pat. No. 7,635,848; Nelson, U.S. Pat. No. 8,017,906; Nelson, U.S. Pat. No. 8,115,174; Nelson, U.S. Pat. No. 8,115,175; Nelson, U.S. Pat. No. 8,183,533; Nelson, U.S. patent application Ser. No. 13/199,612; Nelson, U.S. patent application Ser. No. 13/507,659). Examples of suitable detector configurations include a single or multilayer face-on detector, a single or multilayer edge-on detector and a multilayer detector comprised of face-on and edge-on detectors. Edge-on detectors may incorporate SAR capability and face-on detectors may incorporate DOI capability. Examples of suitable detector materials and formats previously described include semiconductor detectors, structured detectors such as structured 3D silicon (Parker S., et al., IEEE Trans. Nucl. Sci., 53 (2006) 1676-1688; Da Via C., et al., Nucl. Instr. Meth A594 (2008) 7) as well as other structured 3D semiconductor materials (Diamond, Ge, Se, GaAs, CdTe, CZT, etc.), structured Quantum dots (Urdaneta, M. et al., IEEE Nuclear Science Symposium, oral presentation, 2010) and structured scintillators, and scintillators. Structured Quantum dots detectors offer flexibility since a variety of cell shapes (including trenches) can be implemented (Nelson, U.S. patent application Ser. No. 13/507,659). Furthermore, the selection of Quantum dot materials can be varied as a function of position within the substrate in order to enhance a type of interaction such as Compton scattering or the photoelectric effect.

Additional detector options include structured, gas-filled straw detectors with appropriate low-Z or moderate-Z material annuli which provide suitable spatial and temporal resolution (Nelson, U.S. Pat. No. 8,017,906), liquefied gas based detectors (such as Xenon), semiconductor-based or gas-based Medipix detectors and low temperature (such as GE and superconductor) detectors. Multiple Compton-PET (one-sided PET) views of a volume of an object to be imaged can be acquired as a result of detector system rotation about the object to be imaged. An alternative imaging format is to rotate the object and keep the detector system stationary. Additional object volumes can be imaged, if needed, by translating (typically) the object through the scanner system. It should be noted that if the Compton camera image quality isn't suitable for the nuclear medicine imaging applications of interest then a collimator can be inserted in front of the detector so that the system of collimator and detector can function as a conventional SPECT/gamma camera. Since the collimator imposes a degree of directionality then the SPECT/gamma camera implementation of a Compton camera can utilize both Compton scatter interactions (and tracking capabilities) as well as direct photo-electric interactions (which have a much higher probability of occurring at lower energies such as 140.5 keV versus 511 keV in low-Z and high-Z detectors). The direct photo-electric interactions would not be used in conventional (no electron tracking) Compton camera imaging. Furthermore, a miniature version of the Compton-PET detector system can be implemented as a Compton-PET hand-held detector probe. The addition of a nuclear medicine collimator permits the Compton-PET detector probe to function as a gamma camera hand-held detector probe.

Figure 4:
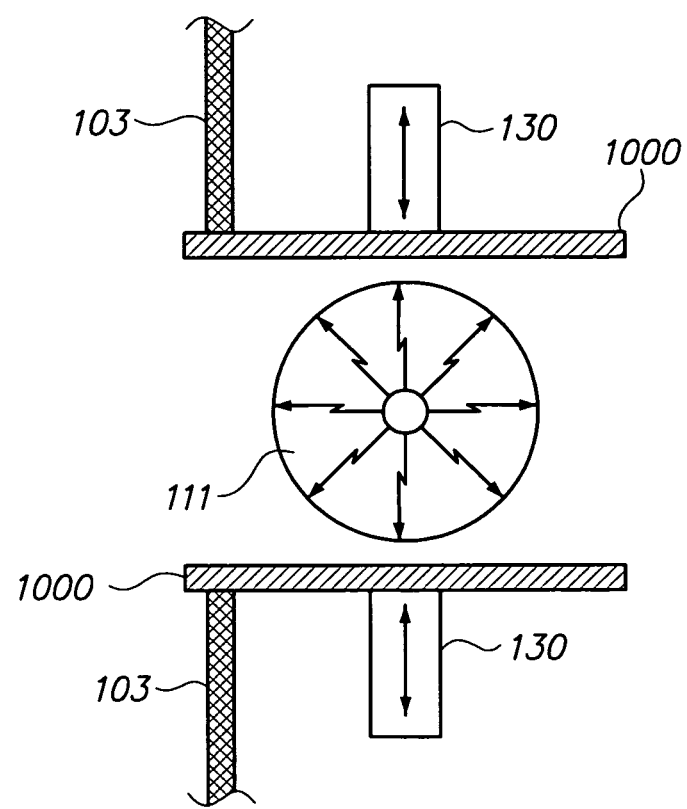
FIG. 4 illustrates a perspective view of a coincidence Compton-PET detector imaging system.

Coincidence Compton-PET detector systems extend the implementations of a non-coincidence Compton-PET detector system previously described by including a second Compton-PET detector system and coincidence circuitry between the pair of Compton-PET detector systems. For example, employing a pair of planar or partial ring Compton-PET detector systems with coincidence circuitry. FIG. 4 shows a perspective view of a coincidence Compton-PET detector system which is comprised of a pair of planar Compton-PET detector systems 1000 with communications links 103 operated in coincidence for imaging an object 111 (for example, the heart). Each planar Compton-PET detector system 1000 is positioned by an electronically controlled actuator arm 130. For the case of a partial ring Compton-PET detector system, if a sufficient number of pairs of partial ring Compton-PET detector systems and coincidence circuitry (linking all detectors) are employed, then a complete ring coincidence Compton-PET detector system can be implemented. The complete ring geometry can be achieved with a single pair of partial ring Compton-PET detector systems if each partial ring covers an angular aperture of 180 degrees. If the Compton scatter capability of a front-end detector is not needed (for example, if only one complete Compton camera is needed for non-PET image applications) then there is the option of employing only a PET-compatible detector for the second detector system. Additional pairs of Compton-PET and/or PET-compatible (or combinations of both) detectors with appropriate coincidence circuitry can be combined to form an enhanced coincidence Compton-PET detector system. (Note that a dummy or non-functional equivalent of the front-end detector can be used to make a stand-alone PET-compatible detector unit "see" a comparable radiation field to what the back-end detector experiences in a coincidence Compton-PET system without the cost of an active front-end detector). The previous description of a flexible non-coincidence Compton-PET detector system applies to the Compton-PET detector systems used in a coincidence Compton-PET detector system. Consider the case in which at least one of the two detector system is a Compton-PET detector system. The front-end and back-end detectors offer suitable 3D spatial resolution, energy resolution and temporal resolution. Both the front-end and back-end detectors must provide adequate temporal resolution for an expected event rate such that accurate event tracking can be enabled both within the front-end and back-end detectors and between the front-end and back-end detectors since Compton scatter and photoelectric interactions can be recorded in both front-end and back-end detectors. As previously described for non-coincidence Compton-PET detector systems this combination of front-end and back-end detectors incorporates the capability of 3 conventional two-layer Compton cameras and 3 conventional Compton telescope cameras. The addition of coincidence detection capability introduces additional flexibility in that events involving a single photoelectric interaction (in which no Compton scattering occurs) can be used for coincidence detection as well as events involving one or more Compton scatter interactions. Since very fast coincidence timing (TOF) can be used to improve reconstruction accuracy and reduce patient dose and/or image acquisition time there can be a benefit from having one or both of the front-end and back-end detectors capable of very fast timing resolution. If both front-end and back-end detectors are involved in the detection process then coincidence timing can be based on using at least one of the front-end and back-end interaction timings. Timing resolution corrections are made for the response of one or both detectors (depending on whether one or both of the front-end and back-end detectors are involved in detection) and gamma ray travel times between interaction locations within one or both detectors and between detectors (Nelson, U.S. Pat. No. 8,017,906). Commercial TOF PET systems are capable of very fast temporal resolution (on the order of or less than one nanosecond). Very fast temporal response capabilities can influence the choice of detector materials for front-end and back-end detectors. If the front-end detector has a reasonable probability per photon of a Compton scatter interaction then one option is to select a front-end detector material with a very fast temporal response and select a (possibly much less expensive) back-end detector material with a much slower temporal response If a gamma ray undergoes a Compton scatter interaction in at least one of the front-end and back-end detectors as well as additional interactions such that the energy of the incident particle can be estimated then photon directionality based on the appropriate Compton camera reconstruction algorithm (for the Compton camera designs described for non-coincidence Compton-PET detector system) can be compared with photon directionality based on coincidence (line-of-sight) between the Compton-PET detector systems operating in coincidence. The Compton-based directionality can be used to estimate the degree of validity of the coincidence (line-of-sight) assumption, including acollinearity. This capability can be used to help reject some of the photons that undergo Raleigh and/or Compton scattering within the object and its surroundings as well as Rayleigh scattering or difficult to detect Compton scattering within the detectors. In addition, a (combined) non-coincidence Compton-PET (one-sided PET) reconstructed image can be compared to a coincidence PET reconstruction image. (Nelson, U.S. Pat. No. 8,017,906). Unpaired detected events (in which coincidence fails since only one of the two annihilation photons is detected and is considered legitimate) by a Compton camera can still contribute to the Compton scatter reconstruction image.

As previously described for the case of non-coincidence Compton-PET (one-sided PET) detector systems, system cost (in some cases) may be reduced if the back-end detector 3D spatial resolution capability is lowered to 2D capability while maintaining adequate energy and temporal resolution. The 2D spatial resolution of the back-end detector implies that it offers limited performance as a stand-alone PET detector for gamma rays that aren't Compton scattered by the front-end detector. The back-end detector should provide good stopping power. The Compton scattering front-end detector offers suitable 3D spatial, temporal and energy resolution. Single and multiple Compton scattering (as well as photoelectric) interactions can occur in the front-end detector, allowing the front-end detector to function as a Compton camera, as a PET camera, as the first layer of a multilayer Compton camera and as the first layer in a multilayer PET camera in which it records the initial interaction location, energy deposition and event timing information. (Note that if the multilayer Compton camera capability is sacrificed then the 2D spatial resolution capability of the back-end detector can be reduced to 1D or even block detector spatial resolution, further reducing costs. The back-end detector primarily provides stopping power along with appropriate energy and temporal resolution. The front-end detector should offer an acceptable probability of undergoing at least one Compton scatter interaction so that an initial location of interaction, timing and energy deposition can be established. If TOF PET imaging is desired then the front-end detector must offer very fast temporal resolution. The front-end detector, due to its 3D spatial resolution capability, can still track multiple scatter interactions as well as photoelectric events. The front-end detector retains the capabilities of a Compton camera and a PET detector. Event tracking between the front-end and back-end detectors is employed.) Multiple Compton-PET or PET views of an object volume to be imaged can be acquired as a result of detector rotation about the object. The alternative imaging format is to rotate the object and keep the detector system stationary. If the Compton camera image quality isn't suitable for the nuclear medicine imaging applications of interest then a collimator can be inserted in front of the detector so that the system of collimator and detector can function as a conventional SPECT/gamma.

For the coincident and non-coincident Compton-PET configurations described there are many options for detector materials based on cost and performance requirements. Assuming that acceptable-to-good energy resolution is desirable, then block, 1D, 2D and 3D back-end detectors and 2D and 3D front-end detectors can use semiconductors, structured 3D semiconductors, structured semiconductor Quantum Dots (nanoparticles), moderate-to-bright nanophosphors, organic and inorganic scintillators, gas and liquid detectors and amplified detectors. Furthermore these detectors can incorporate edge-on SAR or face-on DOI (positional encoding) capabilities. Semiconductor and gas detectors typically offer a Fano factor noticeably less than 1.0. If stopping power is important then sufficient detector material is present in order to provide good-to-excellent attenuation.

Detector response time (for example, scintillator decay time) properties should be suitable for at least event tracking at expected event rates. Very fast detectors would permit the use of TOF information to be utilized in PET reconstruction algorithms. Possible scintillators with at least one of these properties include, but are not limited to: BaFl.sub.2, LaBr.sub.2, LaCl.sub.2, LSO, LYSO, GSO, GdI.sub.3, LuI.sub.3, SrI.sub.2, BaHfO.sub.3, SrHfO.sub.3, PbWO.sub.4, LuAP, CsI:Tl, Sm, NaI:Tl, BGO, CsI:Tl, Lu.sub.2O.sub.3:Eu as well as glass scintillators, liquid scintillators and various fast-to-very fast organic scintillators. Possible semiconductor detectors with at least one of these properties include, but are not limited to: diamond, Si, SiC, Se, Ge, GaAs, CdTe, CZT, HgI.sub.2, PbO, PbI.sub.2, TlBr (as well as low noise implementations such as silicon drift detectors or those with gain such as Si-APDs or SiPMs or iDADs, Se-APDs, GaAsPMs and DiamondPMs); structured 3D Si and other semiconductor materials (Parker S., et al., IEEE Trans. Nucl. Sci., 58 (2011) 404-417) and structured semiconductor Quantum Dots. A number of these semiconductor detectors can be configured as fast or very fast photodetectors and so they can be coupled with fast or very fast organic or inorganic scintillators. Well-known detector packages (a detector material coupled to a readout ASIC) include Medipix-based detectors. Additional structured detectors with gain include, but are not limited to, gas-filled straw detectors (Nelson, U.S. Pat. No. 8,017,906). In addition, the choice of detector material can be influenced by the detector format. For example, a 10 mm thick (or greater) CdTe or CZT face-on detector (used primarily for photo-detection) for PET imaging may offer limited temporal resolution whereas a 1 mm thick (or less) CdTe or CZT edge-on detector (used for photo-detection and/or Compton scattering) may qualify as a fast detector (even if SAR or DOI corrections are not implemented). From a similar perspective a 1 mm or 0.5 mm (or less) thick Si or Ge edge-on detector (used for Compton scattering or Compton scattering and photo-detection) can be employed as a very fast detector. If SAR or DOI capabilities are implemented to estimate the interaction location of an event then timing corrections can be made based on the propagation times of electrons or holes to the anode and cathode, respectively (as described in prior patents: Nelson, U.S. Pat. No. 7,635,848; Nelson, U.S. Pat. No. 8,017,906). An edge-on or face-on structured 3D semiconductor or Quantum Dot detector can be employed as a very fast detector since charge propagation distances can often be less than 50-100 microns.

The flexibility of this Compton-PET design also allows alternative choices for the front-end detector and back-end detector based on factors such as lower cost and non-redundancy of features (if possible) as well as spatial resolution, energy resolution, temporal resolution and the likelihood of Compton scatter and photoelectric interactions. For example a Compton-scatter front-end detector could be employed based on excellent timing resolution despite reduced energy resolution compared to a semiconductor detector. Suitable front-end detector candidates with at least one of these properties include low-Z or moderate-Z, fast and very fast organic or inorganic scintillators (or scintillating fibers) with a suitable high-speed, sensitive optical readout detectors (such as photodiodes, APDs, semiconductor photomultipliers such as SiPMs and GaAsPMs, electron multiplier CCDs, microchannel plates, etc.) detectors, semiconductor-based, scintillator-based or gas-based Medipix detectors and structured, gas-filled straw detectors with appropriate low-Z or moderate-Z material annuli (including the straw material itself) which function as a source of Compton electrons. Previously, the structured straw detectors incorporated only high Z annuli in order to enhance the photoelectric effect (Nelson, U.S. Pat. No. 8,017,906). The same design technique can be used with low-Z and moderate-Z annuli in order to enhance the Compton scatter effect. Furthermore, combinations of low/moderate-Z annuli straw detectors followed by high-Z annuli straw detectors (or other high-Z detectors previously described) can be employed. Detectors should offer an acceptable probability of experiencing at least one Compton scatter interaction so that an initial location of interaction can be established. Event tracking within and between the front-end and back-end detectors can be employed. If the front-end detector offers excellent temporal resolution then TOF information can be used to improve the reconstructed image along with a reduction in patient dose and/or image acquisition time. If a front-end detector lacks good energy resolution it still can be effective if the front-end and back-end detectors offer good spatial resolution and the back-end detector offers good energy resolution. Coincidence (line-of-sight) directionality can be exploited along with the scattered photon angle in order to estimate the incident gamma ray energy for cases of simple Compton scatter. Once the properties of the front-end or back-end detector have been defined then the properties of the other detector can be selected on the basis of which properties need to be accentuated or can be allowed to diminish (such as stopping power, energy resolution, spatial resolution and temporal resolution). The back-end detector may primarily offer stopping power and energy resolution if the front-end detector offers 3D spatial resolution and energy resolution. Then a cost-based decision can be made as to whether the front-end or back-end detector (or both) should provide acceptable, fast or very fast temporal resolution Thus a single detector implementation does not have to embody all of the coveted PET detector properties (high stopping power, 3D spatial resolution, fast or very fast temporal resolution). For example, the coincidence Compton-PET detector system can implement features such as TOF imaging with a range of detector options that is much greater than with commercial (conventional) TOF PET systems. Partial lists of organic and inorganic scintillators and semiconductor including some of their properties are provided in Knoll G, Radiation Detection and Measurement, 4th edition, Wiley, 2010, pages 230 (table 8.2), p. 238 (Table 8.3) and p. 492 (Table 13.3), respectively.

The flexibility of using front-end and back-end detectors for PET which can offer different spatial, temporal and energy resolution for PET results in different PET images based on which detectors interact with the pair of gamma rays from an annihilation event. For example, a Compton-PET front-end detector could Compton scatter one gamma of a pair which is then detected by the back-end detector. Another Compton-PET front-end detector might fail to scatter the other gamma of the pair which is detected by the back-end detector. Coincidence can be established but the timing or spatial resolution (or both) of the front-end detector that detects one gamma may be much better than the timing or spatial resolution of back-end detector that detects the other gamma of the pair. The use of front-end and back-end detectors permits flexibility as to which detector parameters to optimize (temporal, spatial, energy resolution) as well as detector material properties (density, Compton scatter versus photoelectric interaction probability, Compton or photoelectric electron range) for the front-end and back-end detectors. Cost-sensitive decisions can made based on detector characteristics and geometries in terms of how they influence various PET parameters including energy resolution, spatial resolution, temporal resolution, sensitivity, NECR (noise equivalent count rate), true counts, incorrectly classified events, random events, characteristic radiation, Rayleigh scatter, acollinearity, etc. For example, employ 0.5 mm thick, high-resistivity pixelated or structured (3D) Silicon arranged edge-on (adequate energy resolution, improved spatial resolution, faster timing), rather than 1.0 mm thick, detector grade Silicon arranged face-on. Or a material with a higher Z than Silicon could be employed to increase photoelectric interaction probability (Ge, GaAs CdTe, etc.). One possibility is that a front-end detector alone will be adequate. For a dual-layer (or multi-layer) detector system all detector interaction combinations (and thus a range of PET images with different properties) need to be considered.

CT-Compton-PET Detector Systems.

The flexibility of the Compton camera design allows it to be readily adapted for PET (and nuclear medicine) imaging. The Compton camera design can also be adapted for use in diagnostic x-ray imaging applications such as CT and projection radiography (with the understanding that typical data rate requirements will be much higher, spatial resolution requirements may increase, and the operational energy range for diagnostic medical CT is typically lower than for PET and nuclear medicine imaging. Various coincidence and non-coincidence Compton-PET detector system implementations have been described. An extension of this dual-use concept is to describe a multi-use CT-Compton-PET detector system design (with the understanding that nuclear medicine imaging capability can also be implemented). The incorporation of CT features can be explained by examining a special case of a Compton-PET detector system design, the CT-Compton-PET detector system design. This is of interest because CT-PET detector imaging systems are commercially available. However the CT and PET detector imaging sub-systems (which use face-on detectors) are physically distinct. This commercial configuration involves moving the patient with respect to the typical partial ring geometry (or alternatively a cone beam geometry) CT scanner into a physically separate PET scanner. These conventional CT and PET detector sub-systems do not share detectors or the image acquisition space. An alternative to the existing commercial CT-PET detector imaging systems are improved CT-PET detector systems in which the conventional CT scanner or PET scanner (or both) are replaced with novel edge-on CT scanners and/or PET scanners (including Compton-PET detectors) described in this application and prior patents. For example, the traditional face-on detector CT configuration is replaced with an edge-on CT detector system capable of performing at least one of energy integration, PC, and PCE (Nelson, et al., U.S. Pat. No. 6,583,420; Nelson, U.S. Pat. No. 7,291,841; Nelson, U.S. Pat. No. 7,635,848; Nelson, et al., U.S. Pat. No. 8,017,906; Nelson, U.S. Pat. No. 8,115,174; Nelson, U.S. Pat. No. 8,115,175; Nelson, U.S. Pat. No. 8,183,533). A fast, improved CT-PET detector system incorporates multiple x-ray tubes (two, three or more) or x-ray sources (Such as carbon nanotubes, scanning electron beams, etc.) to reduce image acquisition times. Novel PET detectors include, but are not limited to, 3D crossed rod, crossed fiber-rod and encoded PET detectors. The physically separate PET or Compton-PET scanner preferably provides one or more detector features such as suitable or excellent energy resolution, 3D spatial resolution and TOF capability. If reduced PET performance is acceptable then one or more of energy, spatial and temporal resolution can be degraded. PET designs described in prior patents as well as in this patent application can be employed with commercial face-on CT scanners to comprise enhanced CT-PET detector systems. Physically separate commercial PET scanners can also be used with an edge-on CT detector system in another version of an enhanced dual CT-PET imaging system. Still another version of an enhanced dual CT-PET imaging system employs physically separate edge-on CT and PET designs described in this application and prior patents. Yet another version of an enhanced CT-PET imaging system is to employ a conventional face-on detector or edge-on detector CT scanner with a physically separate Compton-PET detector system. An alternative to commercial and enhanced dual CT-PET detector designs are CT-Compton-PET systems in which detector components and/or space are shared, representing a cost effective and compact design compared with the benefit that the patient remains stationary and so registration between CT and PET images is straightforward. Furthermore current CT imaging sub-systems in commercial dual CT-PET systems do not offer PC or PCE capabilities which are available in enhanced dual CT-PET and CT-Compton-PET detector systems. PC or PCE capabilities can be used for dose reduction and/or multispectral imaging. Furthermore, multispectral imaging can be implemented with a PC detector system by implementing x-ray tube voltage switch (currently employed with conventional dual-energy CT detector systems).

CT-Compton-PET detector systems designs incorporate the capabilities previously described for Compton-PET detector systems. One or more layers of detectors can be employed. PET options include non-coincidence (one-sided) and coincidence PET imaging capabilities. The incorporation of x-ray CT capabilities may impose additional requirements on the design of the radiation detectors depending on the energy range for the application (small animal, pediatric, adult, therapy, industrial, HLS, synchrotrons) and the event (data) rates (which, for medical CT imaging, are typically much higher than the event rates encountered in nuclear medicine imaging). In addition collimation may be introduced into the CT detector which would be of a relatively fine nature. The type and amount of collimation introduced into the CT detector configuration is preferably sufficient to at least result in a beneficial reduction in radiation cross talk between detector elements during CT imaging without substantially reducing the efficiency of the PET detector component of the imaging system. If external collimation is employed to reduce the intensity of x-rays scattered by the object from reaching the CT detector and this external collimation has an undesirable impact on PET imaging efficiency or image quality then the external collimation is preferably moveable so that it can rotate or slide out of the detector field of view (FOV) during PET imaging. X-ray scatter correction algorithms, well-known in CT imaging, can also be employed with or without collimation along with corrections for detector effects such as induced charges in nearest-neighbor detector elements, charge cloud diffusion and radiation cross talk (energetic electrons, characteristic x-rays, bremsstrahlung) between detector elements (Nelson, U.S. Pat. No. 7,291,841; Nelson, U.S. Pat. No. 8,017,906). If the PET detector imaging is not implemented simultaneously with the CT detector imaging then an optional movable, attenuating shield (such as, but not limited to Cu, W, Pb, a multilayer material) can be inserted during CT imaging to protect the PET detector from unnecessary radiation damage and then removed during PET imaging. The insertion of conventional nuclear medicine collimation hardware such as parallel or pin hole collimators into these Compton camera designs can provide conventional nuclear medicine imaging capabilities for those cases in which the Compton camera does not offer adequate imaging properties. CT detector modes of operation can include energy integration, PC or PCE. One implementation of a CT-Compton-PET detector system is to simply operate the back-end PET detector independently of the front-end CT detector and accept that the CT detector acts as an attenuator and scatterer of the 511 keV PET gamma rays. More sophisticated CT-Compton-PET detector systems will be described next. Implementations of detector geometries include planar (and focused planar) configurations and focused structure configurations such as rings and partial rings (as well as focused rings and focused partial rings). Planar, ring, and partial ring detector geometries are encountered in conventional medical diagnostic x-ray CT.

CT-Compton-PET detector systems designs described herein are based on implementations of coincidence and non-coincidence Compton-PET detector systems described previously with additional constraints imposed by CT imaging. As was previously discussed, x-ray fluence rates for diagnostic medical x-ray CT are typically sufficiently high that features such as PC and PCE are easier to implement if the distribution of detected events during a time interval is spread out over a number of detector channels. Other constraints on detector selection are related to problems such as dose-dependent pixel performance degradation (including polarization issues) and detector effects described previously. This tends to limit the selection of edge-on or face-on detector to one or more fast-to-very fast, low-to-moderate Z semiconductors with or without gain capability (including, but not limited to, Si, Ge, GaAs, diamond, Se, Si-APDs, SiPMs, iDADs, Se-APDs, GaAsPMs, DiamondPMs), structured 3D semiconductors, structured semiconductor nanoparticles (Quantum Dots) coupled to high speed readout circuitry (such as a custom readout ASIC or a Medipix chip). Other options include configurations such as gas-based Medipix detectors and fast-to-very fast, bright scintillators coupled to photodetectors. Other semiconductor material such as CdTe or CZT may be employed if they are sufficiently thin (typically less than 1 mm) such that issues related to polarization at high data rates can be mitigated. Their pixel performance degradation rates and detector effects must be acceptable (or can, in part, be compensated by evaluating whether any correlated charge was deposited in neighboring pixels as in the case of the Medipix detector chip). For the case of a focused structure detector geometry such as a ring the detector modules can form partial rings (with detectors in a single partial ring that have small gaps or gaps comparable in thickness to 2D edge-on detector plane modules (with optional collimation between the detector plane modules). If gaps are of comparable thickness to the 2D edge-on detector plane modules then the x-ray source is preferably collimated to match the gaps in the detector plane and the collimators and detector need to move along the ring by one pixel width (detector plane width) to acquire a complete projection for reconstruction. This compensating motion and matching x-ray source collimation is not needed if at least two sets of partially-offset or completely-offset detector rings (alternate detector modules are located at two different radii) with gaps comparable to the thickness of 2D edge-on detector modules are employed (Nelson, U.S. Pat. No. 7,291,841). The CT edge-on detector modules employed in a focused structure ring geometry can also be employed in a planar CT detector geometry. One or more layers of edge-on detector modules can be configured to be parallel or tilted with respect to adjacent detector modules in order to achieve a focusing effect. As with the ring geometry implementations, layers of tilted edge-on detector modules can also be partially-offset or completely-offset so that tilted edge-on detector modules in a lower layer fill gaps between edge-on detector modules in the upper layers so that a reasonable continuous detector is emulated. As described previously a focused pixel structure can be implemented along the lengths of the edge-on tilted (or parallel) detector modules. Various configurations of face-on (single or multilayer) detector modules or combinations of face-on and edge-on detector modules, as previously described, may also be employed in planar and ring detector geometries. Optionally, SAR and DOI capabilities can be incorporated into the edge-on and face-on detector modules, respectively.

If the front-end CT detector and the back-end Compton-PET (or PET) detector operate independently of each other then the CT-Compton-PET detector system is a limited CT-Compton-PET detector system (an integrated limited CT-Compton-PET detector system). In this case the range of front-end CT detector designs extends from planar to focused structure (ring and partial ring) geometries and from traditional (low-cost) energy integration detectors to PC to PCE detectors. The front-end CT detector attenuates a fraction of annihilation gamma rays directed toward the back-end Compton-PET (or PET) detector. The planar or focused structure back-end Compton-PET (or PET) detector does not have to occupy the same FOV as the CT detector, larger or smaller FOVs can be implemented according to hardware constraints, cost and desired acquisition times. The back-end Compton-PET (or PET) detector can be designed to operate with a 2D or 3D spatial resolution. Non-coincidence PET (one-sided PET) imaging can be implemented with a limited CT-Compton-PET system in which the back-end detector is a Compton-PET detector. For coincidence PET imaging the back-end Compton-PET (or PET) detector can provide either 2D or 3D spatial resolution capability. Coincidence PET imaging will require the addition of a second PET detector system and the appropriate coincidence circuitry. If the Compton-PET detector offers 3D resolution and tracking capability then both coincidence and non-coincidence PET imaging can be conducted simultaneously. Another implementation of a limited CT-Compton-PET detector system is to position the Compton-PET (or PET) detector outside the FOV of the CT detector. A radiation shield may be inserted between the CT detector and the Compton-PET (or PET) detector during CT operation to limit unnecessary radiation does to the Compton-PET (or PET) detector system.

For CT-Compton-PET detector systems the front-end CT detector also serves as front-end detector layer for a Compton-PET detector system. The readout electronics must be suitable to handle event data rates that are on a comparable scale to the event data rates experienced by CT detectors or the CT detector pixel geometry must be modified to reduce the effective data rate per pixel and so reduce the requirements of the readout electronics. The front-end and back-end detector layers preferably include appropriate internal and intra-layer event tracking capabilities (previously described for coincidence and non-coincidence Compton-PET systems) depending on their intended use.

For CT applications which utilize PC or PCE capabilities several edge-on pixel geometries have been described including uniform pixel sizes (1D or 2D pixel array) and non-uniform pixel sizes (Nelson, U.S. Pat. No. 7,635,848; Nelson, U.S. Pat. No. 8,115,174; Nelson, U.S. Pat. No. 8,115,175; Nelson, U.S. Pat. No. 8,183,533). Issues arise as to x-ray beam hardening with depth of penetration and the benefit of imposing a more-uniform distribution of interaction rates between pixels along the x-ray beam direction (reducing readout errors and readout electronics costs). If the event rate is sufficiently low a uniform pixel distribution may be adequate even if beam hardening occurs with penetration depth. If the event rate is high (as expected in many diagnostic medical x-ray CT applications) and PC or PCE capability is required then a static, uniform 2D pixel array may not offer a good balance in detected event rate per pixel unless the pixel dimensions are relatively small in terms of the stopping power of the detector material. Unfortunately, as pixel size decreases the number of pixels and readout electronics increases which raises the cost of the detector modules. In addition to detector effects pixel readout noise can increase due to leakage issues associated with small pixels. High event rates and x-ray beam hardening with penetration depth may favor the use of a non-uniform pixel size with increasing detector depth along a pixel column. The pixel length within a column can increased with increasing depth, resulting in a non-uniform (variable) readout element pitch in order to provide a more-balanced count rate per pixel for the readout electronics. Detector pixel distributions as well as the use of collimating septa and/or side shielding for detector modules used in CT systems have been described previously (Nelson, U.S. Pat. No. 6,583,420; Nelson, U.S. Pat. No. 7,291,841; Nelson, U.S. Pat. No. 7,635,848; Nelson, U.S. Pat. No. 8,017,906; Nelson, U.S. Pat. No. 8,115,174; Nelson, U.S. Pat. No. 8,115,175; Nelson, U.S. Pat. No. 8,183,533). Furthermore, the pixel size in the axial direction (the slice thickness) can be non-uniform (benefiting dose reduction). For example, a high resolution pixel size (thin slices) could be implemented near the center of the detector in the axial direction with a lower resolution pixel size (thicker slices) implemented on both sides of the center, Additional non-uniform pixel size distributions can be implemented based on imaging requirements. Additional flexibility is provided when the outputs of two or more pixels in the axial direction can be combined electronically in order to synthesize the desired distribution of pixel sizes in the axial direction. A non-uniform pixel size in the axial direction can be implemented with edge-on detectors and face-on detectors. A non-uniform pixel size distribution can be implemented along an arc segment. The high spatial resolution detectors can (in one implementation) be positioned at the middle of the detector arc (that images the region of interest within the object being scanned) with low spatial resolution detectors on either side. With edge-on detectors the low spatial resolution detectors can be synthesized by combining the outputs of two or more pixels with the same coordinates as measured with respect to the edge-on detectors themselves. Thus, comparable pixels from adjacent edge-on detectors (even if they are offset with respect to their neighbor) are combined. Both PCE and PC readout modes can be deployed as needed according to the imaging requirements along the axial direction and along the arc (such as the need for energy subtraction in a limited region of image). Appropriate beam collimation and filtration can be employed to match the pixel distribution in the axial direction and along the arc. Furthermore, non-uniformity can be extended to include the detector geometry type (mixing of edge-on and face-on detectors). For example, high spatial resolution edge-on detectors are (in one implementation) positioned at the middle of the detector arc (that images the region of interest within the object being scanned) with low spatial resolution face-on detectors on either side (potentially reducing the over-all cost of the detector system). The principles of non-uniformity in pixel size and detector geometry type can be applied to both ring and planar detector systems. Detector configurations of reduced size can be employed if region of interest CT is implemented (retaining the high spatial resolution detectors that image the region of interest within the object being scanned while eliminating the low spatial resolution detectors on either side).

A focused structure, ring geometry Compton camera design (Nelson, U.S. Pat. No. 7,291,841), may not offer optimal performance as a CT-Compton-PET camera for high event (data) rate, fan beam CT diagnostic imaging. The Compton camera would preferably use edge-on detector modules with a uniform pixel size along a column (uniform 3D spatial resolution) whereas the PC or PCE CT system would preferably use edge-on detector modules with a variable readout element pitch along a column. The variable readout element pitch for CT allows the readout rate requirements of the readout ASIC-based electronics to be better balanced between readout elements (pixels) near the entrance surface and pixels distant from the entrance surface which experience a reduced beam intensity. Thus the number of readout elements can be reduced noticeably and fewer readout ASICs of a given performance level are needed compared to a uniform pixel array with many small pixels. If the readout ASICs electronics offer high readout data rates sufficient to handle the maximum expected CT data rates for any pixel in a uniform pixel detector which is preferred for use in a Compton camera or Compton-PET detector then this not an insurmountable constraint. A drawback is a likely increase in cost due to a need for more high speed readout ASICs than would be utilized in a dedicate CT scanner with similar PC or PCE capabilities but a non-uniform pixel distribution with depth. Other issues that may arise due to this CT-COMPTON-PET detector system design and the increased use of high speed readout ASICs are related to an increase in heat generation and therefore new cooling requirements to avoid increased detector noise and thermal expansion issues. There is a possibility that some readout ASICs may be moved closer to the pixels (which may result in certain readout ASICs positioned within the x-ray beam path and therefore altering shielding requirements). Note that this issue of CT detectors with uniform and non-uniform pixel arrays in CT-Compton-PET detector systems affects both the focused structure ring (or partial ring) detector format used in fan beam CT and the planar detector format used in cone beam CT. One alternative is to use readout ASICs of varying performance with respect to depth. The highest speed readout ASICs would readout the pixels close to the entrance surface whereas readout ASICs of progressively slower speeds (but still sufficient for both CT and Compton camera applications) could be used to readout pixels at greater depths. Another alternative is to enable the edge-on detector module electronics to redefine the readout element pitch according to whether the CT-Compton-PET detector system is functioning as a PET detector system or a CT detector system. Thus a detector module can have a selectable (fixed or variable) effective pixel width along a detector row and/or an effective pixel length along a detector column in which the effective pixel width or length is synthesized from the outputs of one or more (typically) uniformly spaced pixels. For example, a variable, effective pixel length can be optimized for CT imaging based on the beam spectrum and the beam intensity. A softer x-ray beam would preferentially be attenuated closer to the detector entrance surface than a harder x-ray beam for a given detector material (for energies away from a detector material k-edge). For the case of a softer x-ray beam of a given intensity the balancing of event rates between successive effective pixels in a column would benefit from electronically synthesizing, relatively smaller effective pixel lengths near the entrance surface. Relatively larger effective pixel lengths would create a better balance of event rates between effective pixels in the case of a harder x-ray beam of a given intensity. The advantage of a synthesized readout is that it can be optimized according to the energy spectrum and the desired readout rates, thus expanding the use of a PC or PCE CT system to a broad range of beam spectrums (applications) while retaining the uniform detector pixel geometry useful for PET (and Compton camera) imaging. Since a SPECT camera employs collimation to define directionality of the incident photons either a uniform or non-uniform detector pixel geometry can be employed (making a CT-SPECT detector system relatively straightforward to implement with appropriate collimation in place). If tracking of Compton-scattered photons within the SPECT camera is implemented then a uniform detector pixel geometry is beneficial. Features such as redefining the readout element pitch (synthesizing an effective pixel length or width) or employing readout ASICs of varying performance with detector depth can be implemented in dedicated CT detector systems as well as CT-Compton-PET detector systems and CT-SPECT detector systems. Furthermore, CT-SPECT detector systems can employ a single detector layer or multiple detector layers.

CT-Compton-PET detector system geometries include planar and focused planar detector systems and focused structure detector systems such as ring and partial ring (as well as focused ring and focused partial ring) detector systems. Non-coincidence and coincidence CT-Compton-PET configurations are described herein based on previous descriptions of non-coincidence and coincidence Compton-PET configurations. The CT x-ray detectors offer suitable 3D spatial resolution, energy resolution (PCE capability) and temporal resolution to be useful for the high x-ray fluence rates encountered in medical and non-medical CT scanning as well as for use as the front-end detector in non-coincidence and coincidence Compton-PET detector systems. Event tracking capability is required for CT-Compton-PET systems.

Non-coincidence CT-Compton-PET detector systems combine CT imaging capability with one-sided PET imaging capability by employing the CT x-ray detector as the front-end detector layer that would be used in a non-coincidence Compton-PET detector system in conjunction with a high-stopping power back-end detector. A flexible design employs front-end and back-end detectors that offer suitable 3D spatial resolution, energy resolution and temporal resolution. Both the front-end and back-end detector layers provide adequate temporal resolution for an expected event rate such that accurate event tracking can be enabled both within the front- and back-end detectors and between the front-end and back-end detectors since Compton scatter and photoelectric interactions can be recorded in both front-end and back-end detectors. All implementations previously described for Non-coincidence Compton-PET (three two-layer Compton cameras and three Compton telescope cameras) are applicable with the added constraints the front-end detector should offer suitable detection efficiency for the x-ray energy spectrums that would be used in CT imaging, it should be compatible with the event rates for CT imaging and it should offer a spatial resolution with depth that is reasonably uniform when Compton and/or PET imaging modalities are employed. FIG. 5 shows a perspective view of a CT-Compton-PET detector system 1000 in a focused structure (partial ring) geometry which includes a point-like x-ray 109 radiation source 125 and a gamma ray 107 radiation source 111. The front-end detector layer 510, comprised of detector modules 102 which use 2D pixelated array radiation detectors 115 in an edge-on geometry with base 106 and communication links 103, performs the dual role as an x-ray CT detector and a front-end detector layer (detector layer 1) for a Compton-PET detector system. The detector modules 102 are mounted in a rigid structure 110. The back-end detector layer 520 (detector layer 2), which could be of a planar or focused structure geometry, is not shown. For comparison, FIG. 1 can be understood to show the front-end and back-end detector layers 510 and 520 (detector layers 1 and 2) for a planar CT-Compton-Pet detector geometry if the front-end detector layer 510 is suitable for CT imaging. A reduction in cost can be realized if the Compton-PET capability is implemented only within a sub-region of the CT detector (for example, a segment of a partial ring detector geometry or a region of a planar detector geometry). In these instances segments of CT detector modules or regions of CT detector modules that are not involved in PET imaging do not need to implement features such as synthesizing variable effective pixel lengths or employing readout ASICs of varying performance with detector depth. Multiple Compton-PET views can still be acquired as a result of detector rotation (in some applications the object can rotate and the detector is stationary). By reducing the active detector area the detection efficiency will be reduced and acquisition times will, in general, increase. Alternatively, acquisition times can be typically be reduced by increasing the PET detector FOV beyond the CT detector FOV. As described previously if the Compton camera image quality isn't suitable for the nuclear medicine imaging applications of interest then a collimator can be inserted in front of the detector so that the system of collimator and detector can function as a conventional SPECT/gamma camera.

Coincidence CT-Compton-PET detector systems extend the implementations of non-coincidence CT-Compton-PET detector systems with the addition of coincidence detection capability by introducing a second Compton-PET detector system along with appropriate coincidence circuitry. If the Compton scatter capability of a front-end detector is not needed then only a PET-compatible detector is needed for the second detector system. Implementations previously described for coincidence Compton-PET detector systems are applicable. Thus, the detector geometries shown in FIG. 1 and FIG. 5 are applicable when employed in a coincidence detection configuration such as FIG. 4. Again, a reduction in cost can be realized if the coincidence Compton-PET or coincidence PET capability is implemented only within a sub-region of the CT detector (for example, a segment of a partial ring or complete ring detector geometry or a region of a planar detector geometry) and a matching Compton-PET or a PET-compatible back-end detector of comparable dimensions is positioned opposite that segment or region of the CT detector. Additional cost savings may be realized if the second coincidence Compton-PET detector system employs a front-end detector that offers comparable performance to the CT detector when used as part of a Compton-PET detector system but it lacks the extreme performance capability of a CT detector. Acquisition times can be typically be reduced by increasing the PET detector FOV beyond the CT detector FOV. Multiple Compton-PET or PET views of a limited volume of the subject can be acquired as a result of detector rotation about the subject. In some applications the subject can rotate and the detector is stationary. By reducing the active detector area the detection efficiency will be reduced and acquisition times will increase. If the Compton camera image quality isn't suitable for the nuclear medicine imaging applications of interest then a collimator can be inserted so that the detector can function as a conventional SPECT/gamma camera.

The CT-COMPTON-PET scanner assigns the CT detector to the role of a front-end detector in a Compton-PET detector system when Compton camera or PET (or nuclear medicine) imaging is implemented. Previously an implementation of a coincidence Compton-PET detector was described wherein the front-end detector primarily acted as a Compton scatterer and the back-end detector provided stopping power, energy resolution and temporal resolution sufficient for event tracking with respect to the front-end detector. Options previously described for the front-end detector include sufficiently thin planar semiconductor detectors, structured 3D semiconductor detectors, structured Quantum dot semiconductor detectors and structured low/moderate-Z straw detectors (which typically require lower data rates than the semiconductor-based detectors). If the front-end detector offers an acceptable interaction probability with annihilation gammas and it is fast enough to provide the required coincidence timing resolution (or very fast coincidence timing if TOF PET imaging is desired) then the back-end PET detector requirements can be simplified since its role is primarily to detect Compton-scattered gammas from the front-end detector. If the back-end detector is needed to provide the desired coincidence resolution (including TOF resolution) then the selection of suitable detector materials may be reduced. Reduced spatial resolution would be acceptable for a back-end detector (although Compton camera reconstruction accuracy will be reduced or lost) used in coincidence PET imaging if the front-end detector provides adequate 3D Compton-scatter information. In general, for both coincidence and non-coincidence Compton-PET detector system, a combination of a 3D back-end detector with a 3D front-end detector could improve overall detection efficiency.

PET scan times can be improved by employing additional partial-ring or planar PET or Compton-PET detector systems that operate with or are independent of the coincidence or non-coincidence CT-Compton-PET detector system. These systems are referred to as enhanced coincidence or non-coincidence CT-Compton-PET detector systems. The amount of rotation about the object to acquire a more-complete PET image can be reduced. Another option is to implement a coincidence CT-Compton-PET detector system based on a multiple (two or more) x-ray tube or x-ray source system. For example, the angular arc of a commercial, dual x-ray tube CT partial ring detector is approximately twice that of a single x-ray tube system. Multiple cone beam imaging is implemented if there are two or more x-ray tubes or x-ray sources and corresponding planar detectors. (A well-known example of a multi-planar detector/x-ray tube CT system developed for high speed cardiac and lung CT was the Mayo Dynamic Spatial Reconstructor or DSR first implemented in the late 1970s.) Note that if interior tomography techniques can be implemented then x-ray intensities and/or areas of planar detectors (depending on the application) may be reduced (Yu, H. and G. Wang, Phys Med Biol, Vol. 54(9): p. 2791-2805, 2009). For the case of the focused structure partial ring geometry the CT partial ring detector (the front-end detector) used in a dual x-ray tube configuration can be split into 2 equal CT partial ring detector sections so that at least one CT partial ring detector section (and its back-end detector) can be rotated through 180 degrees when coincidence PET scanning is initiated. This could be particularly beneficial for applications such as fast scan Cardiac CT in conjunction with Cardiac PET CT. Other applications that could benefit from high resolution CT and PET or SPECT (nuclear medicine) imaging capabilities of this system include head imaging and small animal imaging. Note that the back-end detector might cover only a segment of a CT partial ring or complete ring detector (or a region for a planar detector). If coincidence CT-Compton-PET system is implemented the second planar or partial ring PET detector only needs to be comparable in size to the actual PET detector implemented with the first CT planar or partial ring detector. The efficiency of a PET detector system can be improved by adding additional front-end detectors (and corresponding back-end detectors) adjacent to or separate from the CT partial ring detector or the CT planar detector. These front-end detectors could utilize less demanding read-out electronics and would not require features such as pixel synthesis since they would only be used for PET imaging and not CT imaging. Note that for the various PET implementations in which an opposing PET detector would block the x-ray beam path the opposing PET detector is either rotated out of the beam path (the x-ray tube or x-ray source may be physically retracted when not in use) or a small opening is made in the opposing PET detector to pass the collimated x-ray beam (the PET detector rotates with the x-ray tube or x-ray source). Multiple x-ray tubes or x-ray sources (as previously described for fast, improved CT-PET detector imaging systems) can be employed with enhanced integrated non-coincidence or enhanced coincidence CT-Compton-PET detector imaging systems and enhanced limited integrated CT-Compton-PET detector imaging systems. Both stationary and rotating x-ray tube-detector systems can be implemented (both designs have been used with dedicated CT imaging systems).

Figure 6:
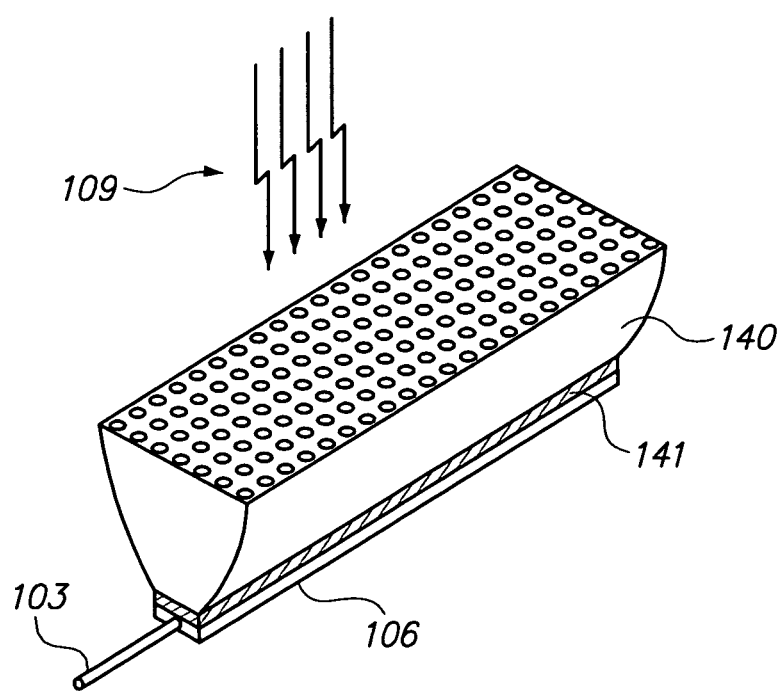
FIG. 6 illustrates a perspective view of a minifying scintillating fiber array coupled to a 1D photodetector structured detector suitable for PC or limited PCE CT imaging.

Dedicated (stand-alone) CT detector imaging system in a ring or planar detector geometry can be implemented by reducing the functionality of the CT-Compton-PET detector imaging systems described herein. As previously detailed, detectors with fixed (or variable) uniform or non-uniform pixels can be implemented with the requirement that the detectors can perform efficiently at the event count rates per pixel encountered in medical CT imaging. CT detectors include single layer and multilayer detectors comprised of face-on detectors and/or edge-on detectors including gas, scintillator, semiconductor, low temperature (such as Ge and superconductor) and structured detectors (such as structured 3D semiconductor, structured Quantum dot and scintillator-photodetector structured detectors). Single layer and multilayer detector designs of Compton cameras described previously and herein can be implemented in a dedicated CT detector imaging system with PCE capability (a simplification would be a design that provides PC capability). Consider a single layer, edge-on detector implementation for a medical CT imaging system in which detector planes are aligned with the Z-axis in a ring geometry. 2D Si edge-on detectors with a wafer thickness of (for example) approximately 500 um as currently implemented may be preferred over relatively thick, expensive, face-on CdTe or CZT detectors in terms of operational lifetime and temporal response. Alternative edge-on detectors of comparable thickness (approximately 500 microns) which can offer improvements with respect to the stopping power and/or temporal response performance of 2D Si at reduced cost compared to the relatively thick, face-on CdTe or CZT detectors include, but are not limited to, 2D GaAs, 2D CdTe and 2D CZT detectors (as well as low noise implementations, implementations with gain or low temperature implementations such as 2D Ge) and structured detectors (structured 3D semiconductor detectors such as 3D Si, 3D GaAs, 3D CdTe, 3D CZT, 3D Ge, etc. as well as structured Quantum Dot detectors). In addition, detectors with thickness greater than or less than 500 microns can be implemented depending on the image resolution requirements for the CT detector imaging system (medical diagnostic, dental, radiation therapy, industrial, Homeland security, etc.). This single layer, edge-on detector CT imaging system can be employed as a single layer PET imaging system and/or a Compton camera/Nuclear Medicine imaging system. As described previously multiple Compton-PET implementations are possible. Furthermore, PET and Compton camera/Nuclear Medicine imaging can be conducted simultaneously. Depending on the fraction of the ring circumference covered by edge-on detectors additional detectors (of the same or different design) may need to be added to increase coincidence detection efficiency. For the relatively small (hardware) pixel sizes employed in current medical CT imaging systems Si is a reasonably efficient detector for the lower x-ray energies encountered in mammography CT and pediatric CT. For adult CT the efficiency of Si suffers, particularly for x-ray energies above (approximately) 40 keV. A compromise, multilayer detector configuration (for example) could employ an edge-on, 2D or structured 3D Si or GaAs (or a structured Quantum Dot) detector as the low-Z or moderate-Z, front-end detector with a moderate-Z or high-Z, edge-on or face-n, back-end detector. (Note that if low temperature requirements can be met then Ge is a candidate as a moderate-Z, face-on or edge-on detector.) Consider the case of an edge-on, 2D Si front-end detector. It would be of reduced height compared to a single layer, edge-on, 2D Si detector implementation and thus less expensive. The back-end detector (edge-on or face-on) is comprised of a moderate-Z material (such as GaAs or CdTe or CZT) or high-Z material which would emphasize photoelectric interactions with the high energy photons that penetrate the front-end detector. One or more types of back-end, face-on detectors can be configured as 1D detectors that are positioned beneath each of the 2D Si edge-on detectors. The thicknesses of appropriate face-on detectors should not be so great that detrimental effects such as polarization cannot be mitigated. The cost of manufacturing such 1D detectors (material yields, butting pixels, bonding to readout electronics) should be reduced relative to 2D detectors. More than one layer of 1D, face-on detectors can be employed and layers can consist of the same or different materials. An alternative is to position a back-end, edge-on 1D or 2D detector (including structured 3D and Quantum Dot detector implementations) below each front end, 2D Si edge-on detector. The edge-on, 1D detector is less-costly to manufacture whereas the 2D array will typically handle higher data rates and offer better energy resolution. This dual-layer CT design could be used for both low energy and high energy imaging applications. Any combination of suitable edge-on detectors including 2D detectors, structured 3D semiconductor detectors and structured Quantum Dot detectors can be employed for the front-end and back-end detectors. Conventional structured Quantum Dot detectors deploy a single Quantum Dot material. The use of edge-on, structured Quantum Dot detectors creates an opportunity to implement a more flexible detector design. For example, multiple Quantum Dot materials can also be deployed such that low-Z/moderate-Z Quantum Dot materials are positioned near the radiation entrance surface and moderate-Z/high-Z Quantum Dot materials are positioned further from the radiation entrance surface (a multilayer structured Quantum Dot detector). Thus, the selection of Quantum Dot materials can be optimized for different energy ranges and the count rate per pixel as a function of distance from the radiation entrance surface can be more-balanced. Structured Quantum Dot detectors (as well as structured 3D detectors and 2D semiconductor detectors) can be implemented with fixed or adjustable pixels sizes which can be uniform or non-uniform. A moderate-Z or high-Z structured Quantum Dot detector can also be employed in a face-on orientation as a 1D detector positioned after a (for example) low-Z, 2D Si edge-on detector. Furthermore, moderate-Z or high-Z, fast, bright scintillator-photodetector 1-D array detectors (including structured detectors), face-on or edge-on, can be employed after a (for example) low-Z, 2D Si edge-on detector (providing limited energy resolution or simply providing photon counting capability). The photodetector is a fast, sensitive 1D photodetector chosen from (but not limited to) photodiodes, APDs, SiPMs, GaAsPMs, DiamondPMs, electron multiplier CCDs and microchannel plates with a pixel structure or a dual-readout structure. Scintillator-photodetector detectors can employ scintillator screens, deposited scintillator films, and cut scintillator sheets. Scintillator-photodetector structured detectors can employ structured scintillators (such as manufactured scintillator arrays, scintillators that demonstrate columnar growth and scintillators coupled to fiber arrays) as well as scintillating or minifying scintillating, focused or unfocused, fiber arrays. Well-known scintillating fiber materials include, but are not limited to, phosphors, granular phosphors, nanophosphors and Quantum Dots. If limited energy resolution is acceptable or only photon counting is needed for CT then a moderate-Z or high-Z, fast, bright, scintillator-photodetector or scintillator-photodetector structured detector (wherein the photodetector is a fast, sensitive photodetector as previously described) can be used in place of the single layer or dual-layer detector implementations as described herein or elsewhere (see Nelson U.S. Pat. No. 4,560,882; Nelson, U.S. Pat. No. 5,258,145; Nelson, U.S. Pat. No. 8,017,906; Nelson, U.S. patent application Ser. No. 13/507,659). FIG. 6 shows a minifying scintillating fiber array 140 coupled to a 1D photodetector 141 which is incorporated into the base unit 106. The scintillating fiber array coupled to a photodetector readout comprises a structured detector that can be deployed in place of an edge-on detector in a CT scanner. Adjacent structured detectors such as this can be positioned in a continuous, partially-offset or completely offset configuration. It is straightforward to extend this ring detector geometry comprised of an array of 1D scintillator-photodetector detectors oriented parallel to the axial direction to multiple pixel widths along the circumference since planar or shaped entrance surface scintillating fiber optic arrays and small, 2D high speed photodetector arrays are available. The use of 1D scintillator-photodetector detectors may offer advantages (at this time) since manufacturing costs are typically reduced and butting of 1D detectors is generally easier than butting of 2D detectors. The same approach applies to a planar geometry concerning the use of 1D or 2D scintillator-photodetector detectors. Although readout electronics such as ASICs can be attached to the 1D or 2D photodetector sensors externally the readout electronics can alternatively be integrated directly on the substrate of the 1D or 2D photodetector sensors.

THE INVENTION LITERATURE REFERENCES EXPRESSLY INCORPORATED BY REFERENCE

Bornefalk Hans, Danielsson Mats, Svensson Christer, Image Quality In Photon Counting-Mode Detector Systems, U.S. Patent Publication No. 2010/0215230 A1 [Aug. 26, 2010].

Danielsson Mats, Karlsson Staffan, Silicon Detector Assembly For X-ray Imaging, U.S. Patent Publication No. 2010/0204942 A 1 [Aug. 12, 2010].

Da Via C., et al., Dual Readout-Strip/Pixel Systems, Nucl. Instr. Meth A594 (2008) p. 7.

Knoll G, Radiation Detection and Measurement, 4th edition, Wiley, 2010.

Kroeger R, et al., Three-Compton Telescope: Theory, Simulations, and Performance, IEEE Trans. Nucl. Sci., Vol. 49(4), pp. 1887-1892, August 2002.

Nelson R, Barbaric Z, High Efficiency X-Radiation Converters, U.S. Pat. No. 4,560,882 [12-24-85].

Nelson R, X-ray Detector for Radiographic Imaging, U.S. Pat. No. 4,937,453 (6-26-90).

Nelson R, Method for Manufacturing a High Resolution Structured X-ray Detector, U.S. Pat. No. 5,258,145 [11-02-93].

Nelson R, Nelson W, Device and System for Improved Imaging in Nuclear Medicine and Mammography, U.S. Pat. No. 6,583,420 [Jun. 24, 2003].

Nelson R, Nelson W, Device and System for Enhanced SPECT, PET, and Compton Scatter Imaging in Nuclear Medicine, U.S. Pat. No. 7,291,841 [Nov. 6, 2007].

Nelson R, Devices and Systems for Enhanced SPECT, PET, and Compton Gamma Cameras, U.S. Pat. Nos. 7,635,848; 8,115,174/175 [Dec. 22, 2009].

Nelson R, Nelson W, Slit and Slot Scan, SAR, and Compton Devices and Systems for Radiation Imaging, U.S. Pat. No. 8,017,906 [Sep. 13, 2011].

Nelson R, Edge-on SAR Scintillator Devices and Systems For Enhanced SPECT, PET, and Compton Gamma Cameras, U.S. Pat. No. 8,115,174 [Feb. 14, 2012].

Nelson R, Edge-on SAR Scintillator Devices and Systems For Enhanced SPECT, PET, and Compton Gamma Cameras, U.S. Pat. No. 8,115,175 [Feb. 14, 2012].

Nelson R, Edge-on SAR Scintillator Devices and Systems For Enhanced SPECT, PET, and Compton Gamma Cameras, U.S. Pat. No. 8,183,533 [May 22, 2012].

Nelson R, Nelson W, High Resolution Imaging System For Digital Dentistry, U.S. patent application Ser. No. 13/199,612 [Sep. 6, 2011].

Nelson R, Nelson W, Enhanced Resolution Imaging Systems For Digital Radiography, U.S. patent application Ser. No. 13/507,659 [Jul. 18, 2012].

Parker S., et al., 3DX: an X-ray pixel array detector with active edges, IEEE Trans. Nucl. Sci., 53 (2006) 1676-1688.

Parker S., et al., Increased speed: 3D silicon sensors; Fast current amplifiers, IEEE Trans. Nucl. Sci., 58 (2011) 404-417.

Singh, M., An electronically collimated gamma camera for single photon emission computed tomography. Part I: Theoretical considerations and design criteria, Medical Physics Vol. 10(4), pp. 421-427, July/August 1983.

Singh, M., Doria D., An electronically collimated gamma camera for single photon emission computed tomography. Part II: Image reconstruction and preliminary experimental measurements, Medical Physics Vol. 10(4), pp. 428-435, July/August 1983.

Urdaneta, M. et al., Quantum dot composite radiation detectors, IEEE Nuclear Science Symposium, oral presentation, 2010.

Yu, H. and G. Wang, Compressed sensing based interior tomography, Phys Med Biol, Vol. 54(9): pp. 2791-2805, 2009.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A detector system for integrated Compton-PET radiation imaging, the detector system comprising:
    an x-ray and gamma ray radiation detector having two or more layers of detector modules configured to generate readout signals based on interactions of x-ray photons from an x-ray radiation source and gamma ray photons from a gamma ray radiation source, wherein at least one layer of the detector modules includes at least one of an edge-on detector module, a structured detector module, or a 3D spatial resolution detector module;
    electronics configured for tracking the interactions of at least one of the x-ray photons or the gamma ray photons and analyzing the readout signals using at least one of energy integration or photon counting or photon counting with energy resolution techniques; and
    an electronic communications link to a computer configured for post-processing, storage, and display of radiation image data generated thereby.

2. The detector system of claim 1, wherein two or more of the layers of detector modules comprise edge-on detector modules irradiated from a side and having a substrate positioned edge-on to at least one of the x-ray photons or the gamma ray photons incident thereon.

3. The detector system of claim 2, wherein the edge-on detector modules are configured in a focused structure geometry comprising a focused planar, focused ring, or focused partial ring detector format.

4. The detector system of claim 3, wherein the edge-on detector modules are tilted with respect to adjacent detector modules to achieve a focusing effect.

5. The detector system of claim 2, wherein the edge-on detector modules have gaps between adjacent detector modules and the gaps are effectively filled by offset of every other detector module in an offset detector layer.

6. The detector system of claim 2, wherein the edge-on detector modules include at least one of gas, scintillator-photodetector, semiconductor, structured or low temperature dielectric medium detectors, or structured 3D semiconductor detectors.

7. The detector system of claim 2, wherein two or more of the edge-on detector modules have an angled pixel structure with focused geometry so as to focus on the radiation source.

8. The detector system of claim 2, wherein the detector modules have geometry types that are non-uniform, and wherein the edge-on detector modules are positioned at a middle of a detector arc that images a region of interest within an object with face-on detectors on either side.

9. The detector system of claim 2, wherein two or more of the edge-on detector modules include at least one of structured 3D semiconductor detectors, structured Quantum Dot radiation detectors, structured semiconductor nanoparticle radiation detectors or structured gas-filled straw detectors, or scintillator-photodetector structured detectors.

10. The detector system of claim 2, wherein two or more of the edge-on detector modules comprise multilayer structured Quantum Dot or semiconductor nanoparticle detectors with low-Z or moderate-Z Quantum Dot or semiconductor nanoparticle materials positioned near a radiation entrance surface and moderate-Z or high-Z Quantum Dot or semiconductor nanoparticle materials positioned farther from the radiation entrance surface.

11. The detector system of claim 1, wherein the detector modules provide at least one of block, 1D, 2D and 3D spatial resolution, energy resolution or temporal resolution, or tracking capability.

12. The detector system of claim 1, wherein the detector modules comprise a combination of edge-on and face-on detectors.

13. The detector system of claim 12, wherein the edge-on detectors incorporate sub-aperture-resolution capabilities that enhance detector spatial resolution using sub-aperture resolution (SAR) readout techniques with edge-on, side-irradiation detector geometry to estimate an interaction location of an event in the edge-on, side irradiation detector geometry.

14. The detector system of claim 13, wherein the face-on detectors incorporate depth-of-interaction capabilities to estimate the interaction location.

15. The detector system of claim 1, wherein two or more of the detector modules provide fast temporal resolution configured for time-of-flight PET coincidence imaging.

16. The detector system of claim 1, wherein two or more of the detector modules have pixel sizes that are non-uniform in an axial direction, wherein a high resolution pixel size is implemented near a center of the detector system in an axial direction with lower resolution pixel size on both sides of the center.

17. The detector system of claim 1 or claim 16, wherein two or more of the detector modules have a pixel size that is synthesized, wherein outputs of two or more pixels in the axial direction are combined electronically to synthesize a desired distribution of pixel sizes in the axial direction.

18. The detector system of claim 1, wherein the electronics comprise readout ASICs of varying performance deployed as a function of detector depth along pixel columns in the detector modules, wherein readout ASICs of progressively slower speeds read out pixels at greater detector depths.

19. The detector system of claim 1, wherein the electronics are configured for tracking at least one of x-ray or gamma ray interactions within and between two or more layers of the detector modules.

20. The detector system of claim 19, wherein the electronics are further configured for coincidence detection of the gamma ray interactions between a pair of such detector systems facing each other and positioned on opposite sides of an object to be imaged.

21. The detector system of claim 1, wherein the electronics comprise shielded readout ASICs mounted within an etched region along a bottom edge of a semiconductor detector substrate of the detector modules.

22. The detector system of claim 1, further comprising a nuclear collimator positioned between the detector modules and the object being imaged thereby, and wherein the detector system is configured for 3-D imaging.

23. The detector system of claim 1, wherein individual modules of the detector modules are configured for at least one of x-ray or gamma ray photon counting, photon counting with energy resolution, energy integrating, or x-ray or gamma ray photon interaction tracking.

24. The detector system of claim 1, wherein two or more of the detector modules comprise structured gas-filled straw detectors with low-Z or moderate-Z annuli material selected to enhance Compton scatter.

25. The detector system of claim 1, wherein the detector system is configured as a non-coincidence Compton-PET imaging system.

26. The detector system of claim 25, wherein the detector system is further configured as an integrated non-coincidence Compton-PET imaging system wherein two or more of the layers of detector modules comprise edge-on detectors irradiated from a side and having a substrate positioned edge-on to at least one of x-rays or gamma rays incident thereon.

27. The detector system of claim 25, wherein the non-coincidence Compton-PET imaging system is modified to function as a SPECT imaging system.

28. The detector system of claim 25, wherein the non-coincidence Compton-PET imaging system is implemented as a hand-held detector probe.

29. The detector system of claim 28, wherein the non-coincidence Compton-PET imaging system is modified to function as a gamma camera hand-held detector probe.

30. The detector system of claim 1, wherein the detector system is configured as a coincidence Compton-PET imaging system.

31. The detector system of claim 30, wherein the detector system is further configured as an integrated coincidence Compton-PET imaging system wherein two or more of the layers of detector modules comprise edge-on detectors irradiated from a side and having a substrate positioned edge-on to at least one of x-rays or gamma rays incident thereon.

32. The detector system of claim 30, wherein the coincidence Compton-PET imaging system is modified to function as a SPECT camera.

33. The detector system of claim 1, wherein the x-ray and gamma ray radiation detector comprises two or more layers of multilayer detector modules.

34. An integrated CT-Compton-PET detector imaging system comprising:
two or more layers of edge-on detector modules irradiated from a side and having a substrate positioned edge-on to at least one of x-ray photons from an x-ray radiation source or gamma ray photons from a gamma ray radiation source, incident thereon;
electronics configured for tracking interactions of the x-ray photons and the gamma ray photons and analyzing the readout signals using at least one of energy integration or photon counting or photon counting with energy resolution techniques; and
an electronic communications link to a computer configured for post-processing, storage, and display of radiation image data generated thereby;
wherein the detector imaging system is configured as a CT detector imaging system and a Compton-PET detector imaging system configured to function independently, with a CT-PET detector imaging system having one or more layers of the edge-on detector modules, and the CT detector imaging system having one or more layers of the edge-on detector modules, and
one or more x-ray tubes or x-ray sources adapted to implement multispectral imaging.

35. The integrated CT-Compton-PET detector imaging system of claim 34, wherein the one or more x-ray tubes or x-ray sources comprise multiple carbon nanotube or scanning electron beam sources adapted for reducing image acquisition time.

36. The integrated CT-Compton-PET detector imaging system of claim 34, wherein the CT-Compton-PET detector imaging system is modified to function as a SPECT camera.

37. The integrated CT-Compton-PET detector imaging system of claim 34, wherein the two or more layers of detector modules comprise multilayer detector modules irradiated from the side and having the substrate positioned edge-on to at least one of the x-ray photons from the x-ray radiation source or the gamma ray photons from the gamma ray radiation source.

38. The integrated CT-Compton-PET detector imaging system of claim 34, wherein the CT-PET detector imaging system comprises at least a first layer of the edge-on detector modules and the CT detector imaging system comprises at least a second layer of the edge-on detector modules or a layer of face-on detector modules.

39. A Compton-PET imaging system comprising:
an x-ray and gamma ray radiation detector having two or more layers of detector modules configured to generate readout signals based on interactions of x-ray and gamma ray photons, wherein one or more of the layer of detector modules comprise edge-on detectors irradiated from a side and having a substrate positioned edge-on to at least one of the x-ray and gamma ray photons incident thereon;
electronics configured for tracking the interactions of at least one of the x-ray photons and the gamma ray photons and analyzing the readout signals using at least one of energy integration or photon counting or photon counting with energy resolution techniques; and
an electronic communications link to a computer configured for post-processing, storage, and display of radiation image data generated thereby.

40. The Compton-PET imaging system of claim 39, wherein the system is configured as a non-coincidence CT-Compton-PET imaging system.

41. The Compton-PET imaging system of claim 40, wherein the non-coincidence CT-Compton-PET imaging system is modified to function as a SPECT camera.

42. The Compton-PET imaging system of claim 39, wherein the imaging system comprises multiple x-ray sources adapted for implementing multispectral imaging.

43. The Compton-PET imaging system of claim 39, wherein the system is configured as a coincidence CT-Compton-PET imaging system.

44. The Compton-PET imaging system of claim 43, wherein the coincidence Compton-PET imaging system is modified to function as a SPECT camera.

45. The Compton-PET imaging system of claim 39, wherein the imaging system comprises multiple scanning electron beam or carbon nanotube x-ray sources adapted for at least one of reducing image acquisition time or implementing multispectral imaging.

46. The Compton-PET imaging system of claim 39, wherein the detector system is configured as a limited coincidence integrated CT-Compton-PET imaging system comprising a CT detector system and a Compton-PET detector system configured to function independently.

47. The Compton-PET imaging system of claim 46, wherein the limited coincidence integrated CT-Compton-PET imaging system is modified to function as a SPECT camera.

48. A CT-Compton-PET detector imaging system according to claim 39, wherein the electronics defines a readout element pitch of the edge-on detector modules according to whether the detector system is functioning as a PET detector system or a CT detector system.

49. A CT-Compton-PET imaging system according to claim 39, wherein the edge-on detector modules have an effective pixel width synthesized from outputs of one or more pixels along a detector row or column.

50. The CT-Compton-PET imaging system of claim 49, wherein the effective pixel length is based on beam spectrum and intensity such that relatively smaller effective pixel lengths are synthesized near the entrance surface for a softer x-ray beam of a given intensity and relatively larger effective pixel lengths are synthesized near the entrance surface for a harder x-ray beam of the given intensity.

51. The Compton-PET imaging system of claim 39, wherein one or more of the detector modules have pixel sizes that are non-uniform in an axial direction, wherein a high resolution pixel size is implemented near a center of the detector system in an axial direction with lower resolution pixel size on both sides of the center.

52. The Compton-PET imaging system of claim 39, wherein one or more of the detector modules have a pixel size that is synthesized, wherein outputs of two or more pixels in the axial direction are combined electronically to synthesize a desired distribution of pixel sizes in the axial direction.

53. A CT detector system comprising:
a radiation detector having two or more layers of detector modules, wherein at least one of the layers comprises one or more edge-on detector modules configured to generate readout signals based on interactions of x-ray photons from an x-ray radiation source or gamma ray photons from a gamma ray radiation source, wherein the one or more edge-on detector modules are irradiated from a side and have a substrate positioned edge-on to at least one of the x-ray or gamma ray photons;
electronics configured for tracking the interactions of the x-ray or gamma ray photons and analyzing readout signals from the detector modules using at least one of energy integration or photon counting or photon counting with energy resolution techniques; and
an electronic communications link to a computer configured for post-processing, storage, and display of radiation image data detected thereby;
wherein the detector system is configured for CT imaging.

54. The CT detector system of claim 53, wherein the radiation detector comprises multilayer detectors.

55. The CT detector system of claim 54, wherein the multilayer detectors include:
at least one of edge-on scintillator photodetectors or edge-on semiconductor detectors, face-on semiconductor detectors, structured detectors or low-temperature detectors; and
face-on scintillator photodetector detectors.

56. The CT detector system of claim 55, wherein the multilayer detectors include a first layer of one or more edge-on scintillator photodetectors or edge-on semiconductor detectors and a second layer of one or more face-on scintillator photodetectors or face-on semiconductor detectors.

57. The CT detector system of claim 53, wherein:
a first layer of the detector modules is comprised of edge-on, low-to-moderate-Z semiconductor detectors or structured detectors; and
a second layer of the detector modules is comprised of face-on, moderate-to-high Z semiconductor detectors, structured detectors or scintillator-photodetector detectors;
wherein individual detector modules of the first and second layers are configured for x-ray or gamma ray photon counting and tracking interactions of at least one of x-ray or gamma ray photons.

58. The CT detector system of claim 55 or claim 57 or claim 53, wherein the detector modules include at least one of 3D semiconductor structured detectors or structured mold semiconductor detectors, or scintillator-photodetector structured detectors.

59. The CT detector system of claim 53, wherein the CT detector imaging system comprises a CT-SPECT detector system.

60. The CT detector system of claim 53, wherein one or more of the detector modules have pixel sizes that are non-uniform in an axial direction, wherein a high resolution pixel size is implemented near a center of the detector system in an axial direction with lower resolution pixel size on both sides of the center.

61. The CT detector system of claim 53, wherein one or more of the detector modules have a pixel size that is synthesized, wherein outputs of two or more pixels in the axial direction are combined electronically to synthesize a desired distribution of pixel sizes in the axial direction.

62. The CT detector system of claim 53, wherein at least two of the layers comprise one or more edge-on detector modules irradiated from a side and having a substrate positioned edge-on to at least one of the x-ray or gamma ray photons.

* * * * *

UNITED STATES PATENT AND TRADEMARK OFFICE
CERTIFICATE OF CORRECTION

PATENT NO. : 10,371,834 B2
APPLICATION NO. : 13/573981
DATED : August 6, 2019
INVENTOR(S) : Robert Sigurd Nelson et al.

Page 1 of 1

It is certified that error appears in the above-identified patent and that said Letters Patent is hereby corrected as shown below:

In the Specification

At Column 6, Lines 31–38, the following remarks should be deleted:
"This material is found verbatim in Nelson et al., U.S. Pat. No. 7,291,841, at Column 5, Lines 43–65; Column 6, Lines 18–34; Column 6, Line 65 – Column 7, Line 8; Column 20, Lines 52–56; Column 21, Lines 4–14 and 47–50; and Column 25, Lines 41–59, respectively.

In the Claims

At Column 34, Line 61 (Claim 48, Line 1):
"A CT-Compton-PET detector imaging system" should be
-- The Compton-PET imaging system --

At Column 34, Line 66 (Claim 49, Line 1):
"A CT-Compton-PET imaging system" should be
-- The Compton-PET imaging system --

At Column 35, Line 3 (Claim 50, Line 1):
"The CT-Compton-PET imaging system" should be
-- The Compton-PET imaging system --

Signed and Sealed this
Twenty-first Day of January, 2020

Andrei Iancu
*Director of the United States Patent and Trademark Office*